United States Patent
Monma et al.

(10) Patent No.: US 11,926,133 B2
(45) Date of Patent: *Mar. 12, 2024

(54) SHEET LAMINATOR, IMAGE FORMING APPARATUS, AND IMAGE FORMING SYSTEM

(71) Applicants: Shinya Monma, Kanagawa (JP); Keisuke Sugiyama, Kanagawa (JP); Tomohiro Furuhashi, Kanagawa (JP); Wataru Takahashi, Tokyo (JP); Ruki Midorikawa, Kanagawa (JP); Sho Asano, Kanagawa (JP)

(72) Inventors: Shinya Monma, Kanagawa (JP); Keisuke Sugiyama, Kanagawa (JP); Tomohiro Furuhashi, Kanagawa (JP); Wataru Takahashi, Tokyo (JP); Ruki Midorikawa, Kanagawa (JP); Sho Asano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 17/969,148

(22) Filed: Oct. 19, 2022

(65) Prior Publication Data

US 2023/0202159 A1 Jun. 29, 2023

(30) Foreign Application Priority Data

Dec. 24, 2021 (JP) .................... 2021-210704

(51) Int. Cl.
*B32B 37/00* (2006.01)
*B32B 38/00* (2006.01)

(52) U.S. Cl.
CPC ........ *B32B 37/0053* (2013.01); *B32B 38/004* (2013.01); *B32B 2037/0069* (2013.01); *B32B 2309/04* (2013.01)

(58) Field of Classification Search
CPC ... B32B 41/00; B32B 37/0053; B32B 38/004; B32B 2037/0069; B32B 2309/04
See application file for complete search history.

(56) References Cited

U.S. PATENT DOCUMENTS

| 5,217,561 A * | 6/1993 | Ueda ................... B32B 38/0036 |
| | | 219/508 |
| 6,893,521 B2 * | 5/2005 | Sasaki ................... B32B 37/185 |
| | | 156/367 |

(Continued)

FOREIGN PATENT DOCUMENTS

| JP | 7-225535 | 8/1995 |
| JP | 2006-053530 | 2/2006 |

(Continued)

OTHER PUBLICATIONS

'Auber Instruments PID Controller', Auber Instruments, Jan. 15, 2019 (Year: 2019).*

(Continued)

*Primary Examiner* — Francisco W Tschen
*Assistant Examiner* — Abhishek A Patwardhan
(74) *Attorney, Agent, or Firm* — Harness, Dickey & Pierce, P.L.C.

(57) ABSTRACT

A sheet laminator includes a sheet lamination device, a heater, and circuitry. The sheet lamination device performs a sheet laminating operation on an object by application of heat and pressure. The heater heats the sheet lamination device. The circuitry changes between a first mode in which the heater constantly heats the sheet lamination device while the sheet lamination device is turned on and a second mode in which the heater starts heating the sheet lamination device in response to a request of the sheet laminating operation and stops heating the sheet lamination device after a given time (Continued)

has elapsed from completion of the sheet laminating operation. The circuitry adjusts the given time in the second mode.

20 Claims, 23 Drawing Sheets

(56) References Cited

U.S. PATENT DOCUMENTS

| | | | | |
|---|---|---|---|---|
| 7,946,326 | B2* | 5/2011 | Lee | B65H 5/305 |
| | | | | 156/367 |
| 11,053,090 | B1* | 7/2021 | Noviello | H04N 1/00039 |
| 2004/0033095 | A1* | 2/2004 | Saffari | G07F 17/3202 |
| | | | | 400/120.01 |
| 2005/0079968 | A1* | 4/2005 | Trovinger | B65H 45/142 |
| | | | | 493/356 |
| 2005/0173063 | A1* | 8/2005 | Hiramoto | B32B 38/004 |
| | | | | 156/324 |
| 2011/0248440 | A1* | 10/2011 | Sugiyama | G03G 15/6552 |
| | | | | 271/272 |
| 2016/0257100 | A1* | 9/2016 | Tachibana | B32B 37/0053 |
| 2017/0021603 | A1* | 1/2017 | Kikuchi | B32B 37/182 |
| 2018/0259895 | A1* | 9/2018 | Shibasaki | B65H 31/38 |
| 2020/0338877 | A1* | 10/2020 | Takahashi | B65H 3/0638 |
| 2022/0291620 | A1 | 9/2022 | Fujita et al. | |

FOREIGN PATENT DOCUMENTS

| | | |
|---|---|---|
| JP | 2006-160429 | 6/2006 |
| JP | 2015-025908 | 2/2015 |

OTHER PUBLICATIONS

'Understanding, Changing, or Disabling Power Saver Mode', Xerox, Jan. 3, 2020 (Year: 2020).*

* cited by examiner

SHEET LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-210704, filed on Dec. 24, 2021, in the Japan Patent Office, the entire disclosure of which is hereby incorporated by reference herein.

BACKGROUND

Technical Field

Embodiments of the present disclosure relate to a sheet laminator that performs a sheet laminating operation on an object to be processed such as a two-ply sheet in which an inner sheet is inserted, an image forming apparatus (for example, copier, printer, facsimile machine, and multi-functional apparatus having at least two functions of the copier, the printer, and the facsimile machine) including the sheet laminator, and an image forming system including the sheet laminator.

Background Art

Various types of sheet laminators (i.e., sheet lamination devices) in the related art perform the sheet laminating operation on an object to be processed (e.g., a two-ply sheet), the object including two sheets overlapped one another and an inner sheet between the two sheets.

Specifically, a sheet laminator in the related art separates (peels) two sheets of a laminated sheet (e.g., a two-ply sheet) in which one sides of the two sheets are bonded at one end of the laminated sheet, and inserts a protective paper (e.g., an inner sheet) between the two sheets. Then, the laminated sheet (the object to be processed) in which the protective paper is inserted is conveyed to a portion (lamination portion) in which a heater is disposed, so that the heater heats and presses the laminated sheet to perform the sheet laminating operation on the laminated sheet.

Another sheet laminator in the art has a technique in which an image forming apparatus receives a request of a sheet laminating operation, acquires heat storage information of a pressure roller, specifies the time to preheat the pressure roller based on the heat storage information, and perform the sheet laminating operation with the heated pressure roller.

SUMMARY

Embodiments of the present disclosure described herein provide a novel sheet laminator including a sheet lamination device, a heater, and circuitry. The sheet lamination device performs a sheet laminating operation on an object by application of heat and pressure. The heater heats the sheet lamination device. The circuitry changes between a first mode in which the heater constantly heats the sheet lamination device while the sheet lamination device is turned on and a second mode in which the heater starts heating the sheet lamination device in response to a request of the sheet laminating operation and stops heating the sheet lamination device after a given time has elapsed from completion of the sheet laminating operation. The circuitry adjusts the given time in the second mode.

Further, embodiments of the present disclosure described herein provide an image forming apparatus including a housing that includes an image forming device to form an image on a sheet, and the above-described sheet laminator.

Further, embodiments of the present disclosure described herein provide an image forming system including an image forming apparatus to form an image on a sheet, and the above-described sheet laminator.

BRIEF DESCRIPTION OF THE SEVERAL VIEWS OF THE DRAWINGS

Exemplary embodiments of this disclosure will be described in detail based on the following figures, wherein:

FIG. 13 including

Figure 1:
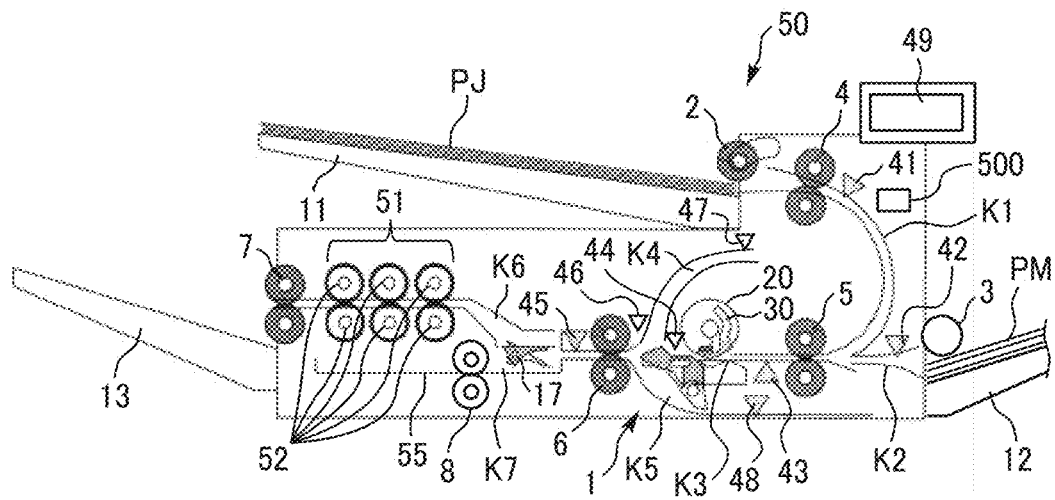
FIG. 1 is a schematic view of a sheet laminator in its entirety, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a sheet laminator, an image forming apparatus, and an image forming system, according to embodiments of the present disclosure, with reference to the drawings.

Note that identical reference numerals are assigned to identical or equivalent components and a description of those components may be simplified or omitted.

First, a description is given of the overall configuration and operations of a sheet laminator 50, with reference to FIG. 1.

FIG. 1 is a schematic view illustrating the overall configuration of a sheet laminator 50 according to an embodiment of the present disclosure.

The sheet laminator 50 includes a sheet separation device 1, a sheet lamination device 51, a first ejection tray 13, and a second ejection tray 55.

The sheet lamination device 51 performs a sheet laminating operation on an object to be processed by application of heat and pressure. The object to be processed is, for example, a two-ply sheet in which an inner sheet PM is inserted between two sheets, that is, a sheet P1 and a sheet P2.

The sheet separation device 1 includes a first feed tray 11, a second feed tray 12, a first feed roller 2, a second feed roller 3, a first conveyance roller pair 4, a second conveyance roller pair 5, a third conveyance roller pair 6, a first sensor 41, a second sensor 42, a third sensor 43, a fourth sensor 44, a fifth sensor 45, a sixth sensor 46, a seventh sensor 47, an eighth sensor 48, a winding roller 20, a moving mechanism 30, and separation claws 16 (see FIGS. 6A to 6C and FIGS. 12A to 12E). Each of the separation claws 16 functions as a separator. The sheet separation device 1 further includes a controller 500 that controls sheet conveyance of the sheet (i.e., the two-ply sheet PJ and the inner sheet PM) by performing, e.g., a sheet separating operation, a sheet laminating operation, and a sheet inserting operation. The controller 500 is connected to various drivers driving various parts and units, for example, the above-described parts and units included in the sheet separation device 1.

The sheet separation device 1 performs the sheet separating operation and the sheet inserting operation. To be more specific, the sheet separation device 1 performs the sheet separating operation to separate the non-bonding portion of a two-ply sheet PJ in which two sheets, which are the first sheet P1 and the second sheet P2, are overlapped and bonded together at one end of the two-ply sheet PJ as a bonding portion A of the two-ply sheet PJ (see FIGS. 12A to 12E and other drawings). The sheet separation device 1 then performs the sheet inserting operation to insert the inner sheet PM between the first sheet P1 and the second sheet P2 separated from each other in the sheet separating operation.

In particular, in the present embodiment, the two-ply sheet PJ is made of the first sheet P1 and the second sheet P2 overlapped and bonded together at one side of the four sides as the bonding portion A. In other words, in the two-ply sheet PJ including the first sheet P1 and the second sheet P2, one side (the bonding portion A) of the first sheet P1 and one side (the bonding portion A) of the second sheet P2 are bonded (attached) by, e.g., thermal welding, and the other side of the first sheet P1 and the other side of the second sheet P2 are not bonded (attached). As the first sheet P1 and the second sheet P2 constructing the two-ply sheet PJ, a transparent film sheet (that is, a laminated sheet) may be employed.

The sheet separation device 1 separates the first sheet P1 and the second sheet P2 constructing the two-ply sheet PJ, in other words, separates the other side of the two sheets that is opposite the bonding portion A that maintains bonding of the first sheet P1 and the second sheet P2. Subsequently, the sheet separation device 1 inserts an inner sheet PM between the separated two sheets, which are the first sheet P1 and the second sheet P2 constructing the two-ply sheet PJ. The inner sheet PM is a sheet including at least one plain sheet or a photograph.

The sheet lamination device 51 includes a mechanism that performs the sheet laminating operation on the two-ply sheet PJ (the object to be processed) after the sheet separation device 1 has performed the sheet separating operation and the sheet inserting operation on the two-ply sheet PJ. The sheet lamination device 51 further includes a heater 52 serving as a heater to heat the sheet lamination device 51.

Specifically, the sheet lamination device 51 performs the sheet laminating operation on the two-ply sheet PJ after the inner sheet PM is inserted between the two sheets, which are the first sheet P1 and the second sheet P2 constructing the two-ply sheet PJ, while the two sheets are separated from each other by the sheet separation device 1. In other words, the sheet lamination device 51 applies heat and pressure on the non-bonding portion of the two sheets (i.e., the first sheet P1 and the second sheet P2 constructing the two-ply sheet PJ) to bond the two sheets together when the inner sheet PM is inserted between the two sheets P1 and P2 of the two-ply sheet PJ. The sheet lamination device 51 is disposed downstream from the sheet separation device 1 in the sheet conveyance direction. In other words, the sheet lamination device 51 is disposed on the downstream side in the forward direction and the left side in FIG. 1. The sheet lamination device 51 includes a plurality of heat-pressure roller pairs 51*a*, 51*b*, and 51*c* aligned along the sheet conveyance direction (see FIGS. 9A to 10C). Specifically, the plurality of heat-pressure roller pairs are a first heat-pressure roller pair 51*a*, a second heat-pressure roller pair 51*b*, and a third heat-pressure roller pair 51*c*. However, the first heat-pressure roller pair 51*a*, the second heat-pressure roller pair 51*b*, and the third heat-pressure roller pair 51*c* may be collectively referred to as the plurality of heat-pressure roller pairs 51*a*, 51*b*, and 51*c* or the heat-pressure roller pairs 51*a*, 51*b*, and 51*c*. Each of the plurality of heat-pressure roller pairs 51*a*, 51*b*, and 51*c* applies heat and pressure to the two-ply sheet PJ while conveying the two-ply sheet PJ in the forward direction with the inner sheet PM being inserted in the two-ply sheet PJ. Further, a fourth sheet conveyance passage K6 that functions as a sheet conveyance passage is disposed between the third conveyance roller pair 6 and the sheet lamination device 51.

As described above, the sheet lamination device 51 includes the plurality of heat-pressure roller pairs 51*a*, 51*b*, and 51*c*, each of which applies heat and pressure to the object to be processed while conveying the object. The object includes the two-ply sheet PJ on which the sheet separation device 1 has performed the sheet separating operation and the sheet inserting operation, and the inner sheet PM.

The heater 52 heats at least one of the two rollers including the heat-pressure roller pairs 51*a*, 51*b*, and 51*c*. To be more specific, in the present embodiment, the two rollers including the heat-pressure roller pairs 51*a*, 51*b*, and 51*c* contact with each other with a given pressure and form a nip region in which the object to be processed is conveyed. Each of the two rollers includes the heater 52 inside the body. When electric power is supplied to the heater 52 from a power source that is controlled by the controller 500, the heat-pressure roller pairs 51*a*, 51*b*, and 51*c* are heated by radiant heat of the heater 52 to apply heat to the object to be processed that passes through the nip region.

In the present embodiment, the heater 52 is provided inside each of the two rollers including the heat-pressure roller pairs 51*a*, 51*b*, and 51*c*. However, the heater 52 may be provided in only one of the two rollers.

In the present embodiment, the heater 52 such as a halogen heater is used as a heater to heat the sheet lamination device 51 (the heat-pressure roller pairs 51*a*, 51*b*, and 51*c*). However, the heater is not limited to this configuration and may be, for example, an electromagnetic induction-heating type heater or a heater using a resistance heating element.

The first ejection tray 13 functions as an ejection tray on which the two-ply sheet PJ (and the inner sheet PM) is stacked when the two-ply sheet PJ is ejected after the sheet laminator 50 has performed the sheet laminating operation on the two-ply sheet PJ.

The second ejection tray 55 functions as an ejection tray to stack a sheet on which the sheet laminator 50 does not perform the sheet laminating operation. Note that the second ejection tray 55 also functions as a retract portion onto which a subsequent two-ply sheet is temporarily purged (ejected), when the sheet laminator 50 performs the sheet laminating operation consecutively. The detailed description of the second ejection tray 55 functioning as a retract portion is given below, with reference to FIGS. 9A to 10C.

The sheet laminator 50 further includes a plurality of sheet conveyance passages such as a first sheet conveyance passage K1, a second sheet conveyance passage K2, a third sheet conveyance passage K3, a first branched sheet conveyance passage K4, a second branched sheet conveyance passage K5, a fourth sheet conveyance passage K6, and a retract sheet conveyance passage K7. Each of the first sheet conveyance passage K1, the second sheet conveyance passage K2, the third sheet conveyance passage K3, the first branched sheet conveyance passage K4, the second branched sheet conveyance passage K5, the fourth sheet conveyance passage K6, and the retract sheet conveyance passage K7 includes two conveyance guides (guide plates) facing each other to guide and convey the sheet such as the two-ply sheet PJ and the inner sheet PM.

In particular, in the present embodiment, the first branched sheet conveyance passage K4 and the second branched sheet conveyance passage K5 branch off in different directions from the third sheet conveyance passage K3. The first branched sheet conveyance passage K4 and the second branched sheet conveyance passage K5 are disposed opposite across the third sheet conveyance passage K3, between the winding roller 20 and the third sheet conveyance passage K3.

Further, the fourth sheet conveyance passage K6 is a sheet conveyance passage extending from (the third conveyance roller pair 6 of) the sheet separation device 1 to the sheet lamination device 51. Further, the retract sheet conveyance passage K7 is a sheet conveyance passage extending from (the sheet lamination device 51 of) the sheet separation device 1 to the second ejection tray 55 (retract portion). To be more specific, the fourth sheet conveyance passage K6 and the retreat sheet conveyance passage K7 branch off in different directions from the downstream side (that is, the left side in FIG. 1) of the third conveyance roller pair 6.

As illustrated in FIG. 1, for example, the two-ply sheet PJ is loaded on the first feed tray 11. The first feed roller 2 feeds the uppermost two-ply sheet PJ on the first feed tray 11, to the first conveyance roller pair 4, and the first conveyance roller pair 4 conveys the two-ply sheet PJ along the first sheet conveyance passage K1.

Each of the first feed tray 11 and the first feed roller 2 functions as a first sheet feeder to feed the two-ply sheet PJ. The first sheet feeder is controlled by the controller 500. To be more specific, the controller 500 drives and rotates the first feed roller 2 to feed the two-ply sheet PJ from the first feed tray 11.

Further, the inner sheet PM is loaded on the second feed tray 12. Then, the second feed roller 3 feeds the uppermost inner sheet PM on the second feed tray 12.

As described above, each of the second feed tray 12 and the second feed roller 3 functions as a second sheet feeder to feed the inner sheet PM that is a sheet to be inserted between the two sheets, which are the first sheet P1 and the second sheet P2 of the two-ply sheet PJ with the non-bonding portion being separated.

Then, the controller 500 causes the second feed roller 3 to drive and rotate as a second sheet feeder, so as to feed the inner sheet PM from the second feed tray 12 as a second sheet feeder.

Then, in the sheet laminator 50 according to the present embodiment, the controller 500 causes the second feed roller 3 (second sheet feeder) to start feeding the inner sheet PM from the second feed tray 12 (second sheet feeder) after the first feed roller 2 (first sheet feeder) has fed the two-ply sheet PJ from the first feed tray 11 (first sheet feeder) and before the operation to separate the non-bonding portion of the two-ply sheet PJ is completed.

In other words, in the present embodiment, the feeding of the two-ply sheet PJ and the feeding of the inner sheet PM are not performed separately (instructed by a user via the operation display panel 49) but can be performed in a single operation. To be more specific, as a user presses the button once on the operation display panel 49 to start the process, the sheet separating operation in which the two-ply sheet PJ is fed and separated, the sheet inserting operation in which the inner sheet PM is inserted into the two-ply sheet PJ between the first sheet P1 and the second sheet P2 separated from each other, and the sheet laminating operation are collectively performed automatically based on the single instruction (request).

The operation to start feeding the inner sheet PM from the second feed tray 12 is performed not after completion of the sheet separating operation of the two-ply sheet PJ but performed before completion of the sheet separating operation of the two-ply sheet PJ. Due to such a configuration, the time for a series of steps from when the two-ply sheet PJ is fed from the first feed tray 11 to when the inner sheet PM is completely inserted in the two-ply sheet PJ is reduced efficiently, and the productivity of the sheet separation device 1 is enhanced. In other words, the time for the operation from the start to the end performed by the sheet separation device 1 is reduced.

Each of the first conveyance roller pair 4, the second conveyance roller pair 5, the third conveyance roller pair 6, a first ejection roller pair 7, and a second ejection roller pair 8 includes a drive roller and a driven roller and conveys the sheet nipped by the respective nip regions. The third sheet conveyance passage K3 includes the second conveyance roller pair 5, the winding roller 20, and the third conveyance roller pair 6, from the upstream side in the sheet conveyance direction. In particular, the winding roller 20, the third conveyance roller pair 6, and the second ejection roller pair 8 are rotatable in a forward direction or in a reverse direction. The third conveyance roller pair 6 and the second ejection roller pair 8 convey the sheet in the forward direction that is the left direction in FIG. 1 and in the reverse direction that is the right direction in FIG. 1. The third conveyance roller pair 6 also functions as a sheet conveying roller pair that conveys the sheet to the sheet lamination device 51 or to the second ejection tray 55. The first ejection roller pair 7 functions as a sheet conveying roller pair that conveys and ejects the two-ply sheet PJ (and the inner sheet PM) after the sheet laminating operation, toward the first ejection tray 13.

Note that a switching claw 17 is disposed downstream from the third conveyance roller pair 6 in the forward direction (sheet conveyance direction to the left in FIG. 1). The switching claw 17 that functions as a switcher switches the direction of conveyance of the sheet P, for example, by conveying the sheet P toward the sheet lamination device 51 or toward the second ejection tray 55.

That is, the switching claw 17 functions as a switcher that switches a first state and a second state. The first state is a state in which the fourth sheet conveyance passage K6 is open and the retract sheet conveyance passage K7 is closed, which is the state illustrated in FIG. 9A, for example. The second state is a state in which the fourth sheet conveyance passage K6 is closed and the retract sheet conveyance passage K7 is open, which is the state illustrated in FIG. 9C, for example.

The switching claw 17 is controlled according to the mode selected by a user (in particular, when the sheet laminating operation is consecutively performed on the plurality of two-ply sheets PJ), so as to switch the direction of conveyance (ejection) of the sheet P. A detailed description is given below of the operations of the switching claw 17 functioning as a switcher, with reference to FIGS. 9A to 9D and FIGS. 10A to 10C, for example.

Referring to FIG. 1, each of the first sensor 41, the second sensor 42, the third sensor 43, the fourth sensor 44, and the fifth sensor 45, the seventh sensor 47, and the eighth sensor 48 functions as a sheet sensor employing a reflective photosensor that optically detects whether the sheet is present at the position of each sensor. The first sensor 41 is disposed near a portion downstream from the first conveyance roller pair 4 in the sheet conveyance direction. The second sensor 42 is disposed near a portion downstream from the second feed roller 3 in the sheet conveyance direction. The third sensor 43 is disposed near a portion downstream from the second conveyance roller pair 5 in the sheet conveyance direction. The fourth sensor 44 is disposed near a portion downstream from the winding roller 20 (at the left side of the winding roller 20 in FIG. 1) and upstream from the third conveyance roller pair 6 (at the right side of the third conveyance roller pair 6 in FIG. 1) in the sheet conveyance direction. The fifth sensor 45 is disposed downstream from the fourth sheet conveyance passage K6 from the sheet separation device 1 to the sheet lamination device 51 (at the left side of the third conveyance roller pair 6 in FIG. 1) in the sheet conveyance direction. Further, the seventh sensor 47 is disposed on the first branched sheet conveyance passage K4. The eighth sensor 48 is disposed on the second branched sheet conveyance passage K5.

Note that the sixth sensor 46 functions as an abnormality detector that detects an abnormal state while the sheet separating operation is performed. The detailed description of the sixth sensor 46 is given below.

A description is given of the winding roller 20, with reference to FIGS. 2A, 2B, 3A, 3B, 5B to 5D, and 6A.

Figure 2A:
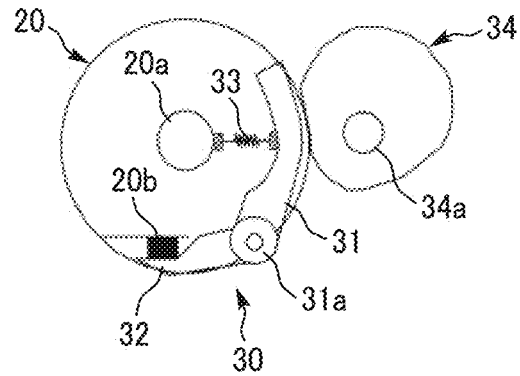
FIG. 2A is a side view of a gripper that has moved to a gripping position in the sheet laminator illustrated in FIG. 1.

FIG. 2A is a side view of a gripper that has moved to a gripping position in the sheet laminator illustrated in FIG. 1.

Figure 2B:
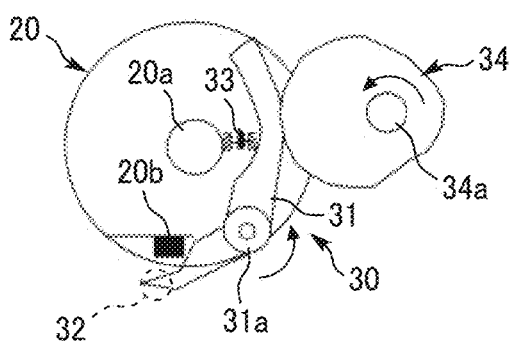
FIG. 2B is a side view of the gripper that has moved to a releasing position in the sheet laminator illustrated in FIG. 1.

FIG. 2B is a side view of the gripper that has moved to a releasing position in the sheet laminator illustrated in FIG. 1.

Figure 3A:
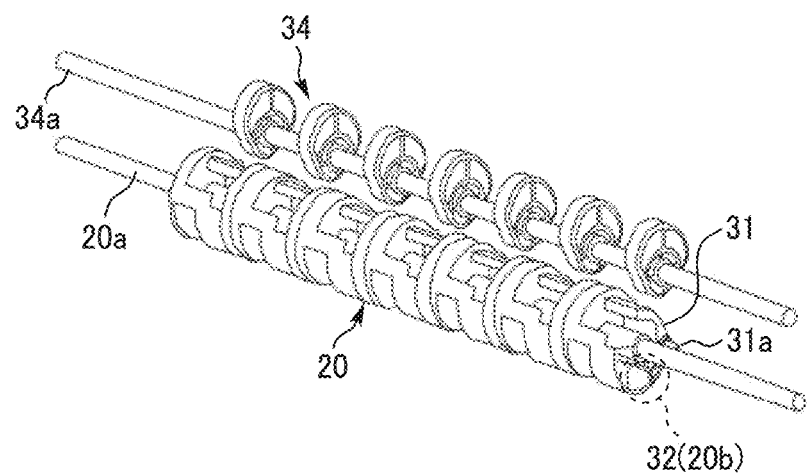
FIG. 3A is a perspective view of the gripper that has moved to the gripping position in the sheet laminator illustrated in FIG. 1.

FIG. 3A is a perspective view of the gripper that has moved to the gripping position in the sheet laminator illustrated in FIG. 1.

Figure 3B:
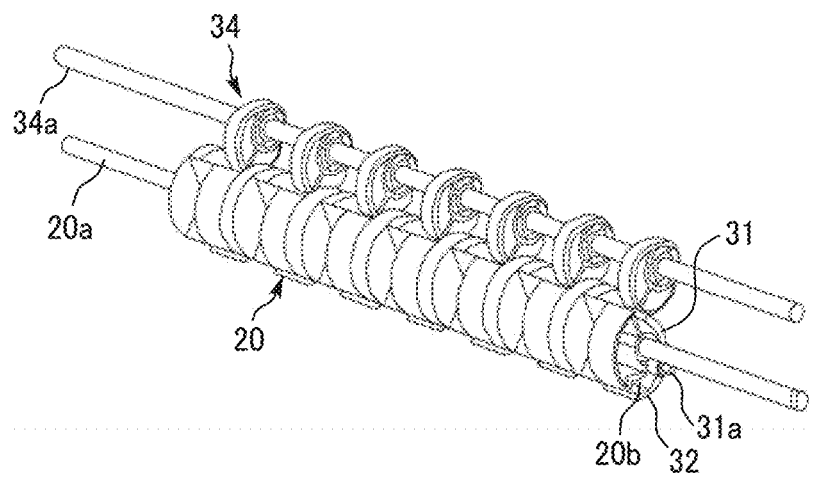
FIG. 3B is a perspective view of the gripper that has moved to the releasing position in the sheet laminator illustrated in FIG. 1.

FIG. 3B is a perspective view of the gripper that has moved to the releasing position in the sheet laminator illustrated in FIG. 1.

FIGS. 4A to 4D are schematic views, each illustrating the sheet separating operation performed in the sheet laminator illustrated in FIG. 1.

FIGS. 5A to 5D are schematic views, each illustrating the sheet separating operation performed in the sheet laminator, subsequent from the sheet separating operation of FIGS. 4A to 4D.

Figure 5A:
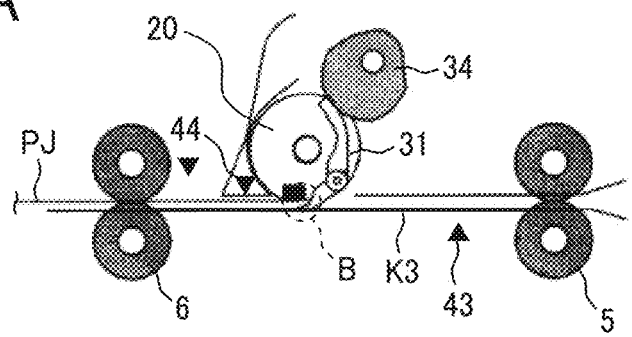
FIGS. 5A, 5B, 5B', 5C, 5C', and 5D are schematic views, each illustrating the sheet separating operation performed in the sheet laminator, subsequent from the sheet separating operation of FIGS. 4A, 4B, 4C, and 4D.
Figure 5B:
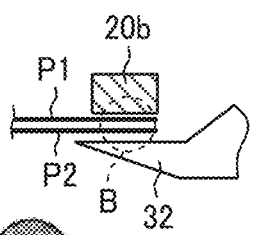
Figure 5B:
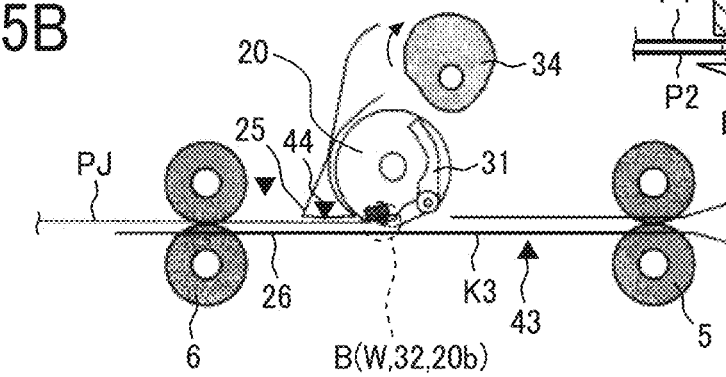
Figure 5C:
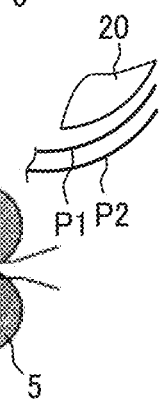
Figure 5C:
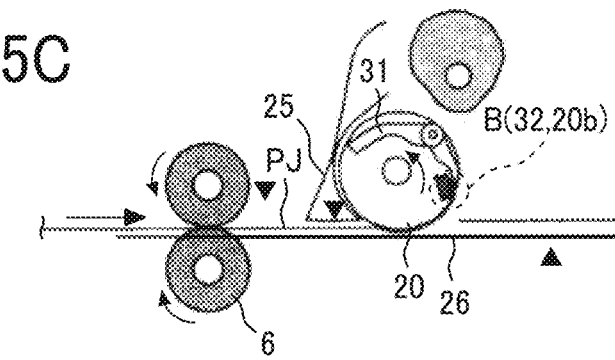
Figure 5D:
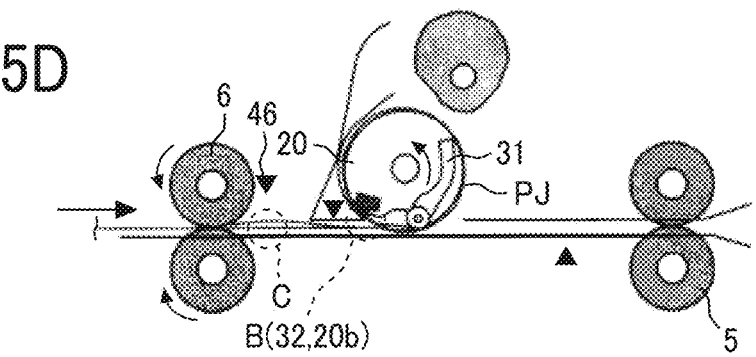
Figure 6A:
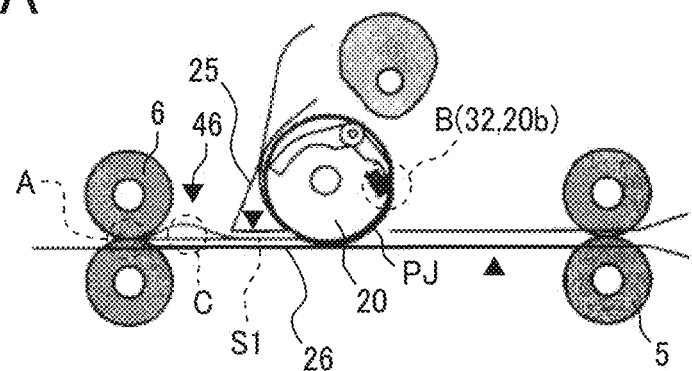
FIGS. 6A, 6B, and 6C are schematic views, each illustrating the sheet separating operation performed in the sheet laminator, subsequent from the sheet separating operation of each of FIGS. 5A, 5B, 5B', 5C, 5C', and 5D.
Figure 6B:
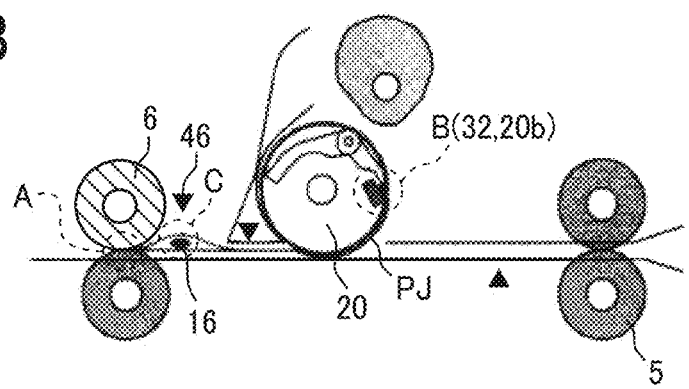
Figure 6C:
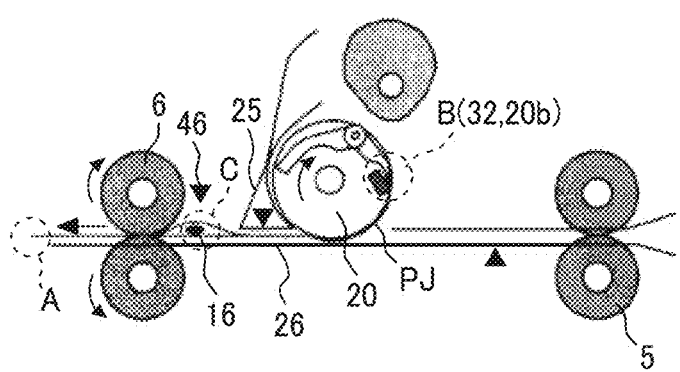

FIGS. 6A to 6C are schematic views, each illustrating the sheet separating operation performed in the sheet laminator, subsequent from the sheet separating operation of each of FIGS. 5A to 5D.

The winding roller 20 is a roller that winds the two-ply sheet PJ, with a gripper 32 that functions as a gripper (handle) gripping a gripped portion B of the two-ply sheet PJ at a winding start position W (see FIG. 5B). The gripped portion B is an end of the two-ply sheet PJ that is opposite an end at which the bonding portion A is formed, which is referred to as the other end of the two-ply sheet PJ. While the gripper 32 grips the gripped portion B of the two-ply sheet PJ, the winding roller 20 rotates in a given rotation direction (that is, the counterclockwise direction in FIGS. 5A to 5D) to wind the two-ply sheet PJ around the winding roller 20. The winding roller 20 is rotatable around a rotary shaft 20a in the forward direction and in the reverse direction. The controller 500 controls a drive motor that drives the winding roller 20.

To be more specific, the two-ply sheet PJ is fed from the first feed tray 11, passes through the first sheet conveyance passage K1, and is conveyed by the second conveyance roller pair 5 in the forward direction along the third sheet conveyance passage K3. The two-ply sheet PJ then passes through the winding start position W of the winding roller 20 once and is conveyed to a position of the third conveyance roller pair 6 that is a position at which the trailing end of the two-ply sheet PJ passes through the fourth sensor 44 but does not pass through the third conveyance roller pair 6, that is, the position before the third conveyance roller pair 6. Thereafter, the third conveyance roller pair 6 rotates in the reverse direction to convey the two-ply sheet PJ in the reverse direction to the position of the winding roller 20 that is the winding start position W, and the gripper 32 grips the other end (leading end) of the two-ply sheet PJ. The two-ply sheet PJ is further conveyed in a state in which the other end (leading end) of the two-ply sheet PJ is gripped by the gripper 32, and the winding roller 20 rotates in the counterclockwise direction in FIG. 1 to wind the two-ply sheet PJ around the winding roller 20.

With reference to FIG. 5C', as the winding roller 20 winds the two-ply sheet PJ, the length of a sheet wound around the winding roller 20 is proportional to the diameter of the winding roller 20. For this reason, the first sheet P1 is on the inner side to the center of the winding roller 20, that is, closer to the inner circumferential face of the winding roller 20, than the second sheet P2 on the outer side to the center of the winding roller 20, that is, closer to the outer circumferential face of the winding roller 20, and the length of the first sheet P1 wound around the winding roller 20 is shorter than the length of the second sheet P2 wound around the winding roller 20. As a result, misalignment occurs in a part of the two-ply sheet PJ in which the sheet P1 is in close contact with the sheet P2 (in other words, the part in which the sheet P1 sticks to the sheet P2) other than the bonding portion A and the gripped portion B. The misalignment causes the first sheet P1 to slack and bend toward the second sheet P2, forming a gap C between the two sheets, which are the first sheet P1 and the second sheet P2, in the vicinity of the bonding portion A of the two-ply sheet PJ, as illustrated in FIGS. 5D and 6A. In other words, when the first sheet P1 that is placed on the second sheet P2 is warped upward, the gap C is formed between the first sheet P1 and the second sheet P2 at one end of the two-ply sheet PJ, that is, the upstream side in the sheet conveyance direction when the two-ply sheet PJ is conveyed in the right direction in FIG. 1.

As described above, the first sheet P1 and the second sheet P2 that are in close contact with each other without any gap are separated from each other.

Particularly in the present embodiment, in order to significantly form the gap C as described above, that is, in order to increase the difference between the length of the first sheet P1 wound around the winding roller 20 and the length of the second sheet P2 wound around the winding roller 20, the two-ply sheet PJ is wound around the winding roller 20 at least one round.

As described above, in the present embodiment, by providing the winding roller 20 to wind the two-ply sheet PJ around the rotary shaft 20a, the two-ply sheet PJ is separatable without increasing the size and cost of the sheet laminator 50.

As illustrated in FIG. 5B', the gripper 32 in the present embodiment grips the gripped portion B of the two-ply sheet PJ without contacting the end face of the other end of the gripped portion B of the two-ply sheet PJ.

To be more specific, the gripper 32 nips and grips the gripped portion B of the two-ply sheet PJ between the gripper 32 and a receiving portion 20b of the winding roller 20 without causing any member to contact the end face of the other end of the two-ply sheet PJ, in other words, without causing any member to hit or contact the end face of the two-ply sheet PJ. The receiving portion 20b of the winding roller 20 is a part of the outer circumferential portion of the winding roller 20 and is arranged to be exposed outwardly and facing the gripper 32.

To be more specific, the two-ply sheet PJ is not nipped and gripped by the gripper 32 and the receiving portion 20b of the winding roller 20 when a specific member such as the gripper 32 contacts the end face of the other end (that is the leading end face). The two-ply sheet PJ is nipped and gripped by the gripper 32 and the receiving portion 20b while the end face of the other end (leading end face) does not contact any member. At this time, the gripper 32 is located close to the second sheet P2 on the outer side to the center of the winding roller 20 and the receiving portion 20b is located close to the first sheet P1 on the inner side to the center of the winding roller 20.

Accordingly, when compared with a configuration in which the leading end face of the two-ply sheet PJ contacts a member, the above-described structure according to the present embodiment can reduce damage on the two-ply sheet PJ (particularly, the leading end). In particular, once the leading end face of the two-ply sheet PJ is damaged, it is difficult to perform the sheet laminating operation on the damaged leading end face. For this reason, the configuration of the present disclosure is useful.

Note that, in the present embodiment, the bonding portion A of the two-ply sheet PJ wound around the winding roller 20 is the one end of the two-ply sheet PJ. The one end is opposite to the other end functioning as the gripped portion B.

In the present embodiment, at least the gripper 32 (handle) or the receiving portion 20b is made of elastic material such as rubber.

According to this configuration, when compared with a sheet separation device having a configuration in which the gripper 32 and the receiving portion 20b have rigid bodies made of metal or resin, the above-described sheet separation device 1 according to the present embodiment enhances the gripping force to grip the two-ply sheet PJ and prevents the surfaces of the two-ply sheet PJ from being damaged. In particular, the sheet separation device 1 including the gripper 32 and the receiving portion 20b made of the elastic material easily exhibits the above-described effect.

As illustrated in FIGS. 2A, 2B, 3A, and 3B, the moving mechanism 30 moves the gripper 32 between a gripping position (a position illustrated in FIGS. 2A and 3A) at which the gripper 32 can grip the two-ply sheet PJ and a releasing position (a position illustrated in FIGS. 2B and 3B) at which the gripper 32 is released from the gripping position.

Specifically, the moving mechanism 30 includes an arm 31, a compression spring 33 as a biasing member, a cam 34, and a motor that rotates the cam 34 in forward or in reverse.

The arm 31 holds the gripper 32. The arm 31 and the gripper 32 are held together by the winding roller 20 to be rotatable together around a support shaft 31a. In the present embodiment, the gripper 32 is coupled to the tip of the arm 31, and the gripper 32 and the arm 31 are made (held) as a single unit. Alternatively, the gripper 32 and the arm 31 may be made as separate members, and the gripper 32 may be mounted on the arm 31, that is, may be held by the arm 31. In any case, the arm 31 holding the gripper 32 rotates around the rotary shaft 20a together with the winding roller 20.

The compression spring 33 functions as a biasing member that biases the arm 31 so that the gripper 32 moves from the releasing position illustrated in FIG. 2B to the gripping position illustrated in FIG. 2A. To be more specific, one end of the compression spring 33 is coupled to a fixed position near the rotary shaft 20a, and the other end of the compression spring 33 is coupled to one end of the arm 31 that is an end opposite to the other end of the arm 31 coupled to the gripper 32 with respect to the support shaft 31a.

The cam 34 pushes the arm 31 against the biasing force of the compression spring 33 that functions as the biasing member, so that the gripper 32 moves from the gripping position illustrated in FIG. 2A to the releasing position illustrated in FIG. 2B. The motor that is controlled by the controller 500 drives the cam 34 to rotate in the forward direction or the reverse direction at a desired rotation angle. The cam 34 is held by the housing of the sheet laminator 50 so as to be rotatable around a cam shaft 34a separately from the winding roller 20.

In the moving mechanism 30 including the above-described configuration, as illustrated in FIGS. 2A and 3A, when the cam 34 is not in contact with the arm 31, the arm 31 is biased by the compression spring 33 to press the gripper 32 against the receiving portion 20b. This state is referred to as a closed state. In the closed state, the gripper 32 and the receiving portion 20b grip the two-ply sheet PJ.

By contrast, as illustrated in FIGS. 2B and 3B, when the cam 34 contacts and presses the arm 31, the arm 31 rotates in the counterclockwise direction in FIG. 2B around the support shaft 31a against the biasing force of the compression spring 33, so that the gripper 32 separates from the receiving portion 20b. This state is referred to as an open state. In the open state, the two-ply sheet PJ is not gripped, which is referred to as a grip release state.

Note that, in the present embodiment, as illustrated in FIGS. 3A and 3B, the winding roller 20 includes a plurality of roller portions (i.e., seven roller portions in the present embodiment) disposed at given intervals in the axial direction of the winding roller 20. Similarly, the cam 34 includes a plurality of cam portions disposed at given intervals in the axial direction of the cam 34 so that the divided positions of the plurality of cam portions of the cam 34 respectively meet and face the plurality of roller portions of the winding roller 20.

Setting portions provided at given intervals in the axial direction to grip the two-ply sheet PJ as described above, that is, not setting the entire area of the winding roller 20 and the cam 34 in the axial direction to grip the two-ply sheet PJ share load necessary to grip the two-ply sheet PJ. The above-described configuration is useful when a gripping force required to grip the two-play sheet PJ increases.

Figure 4A:
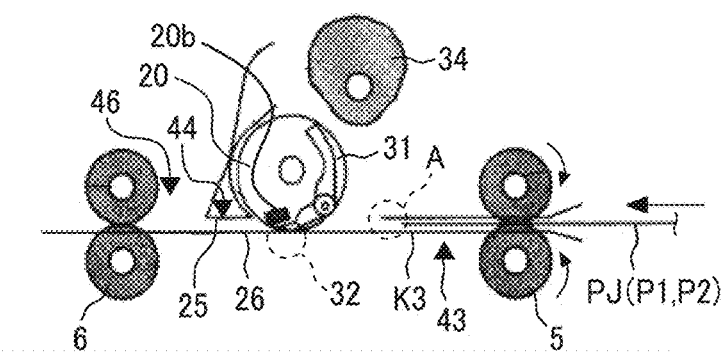
FIGS. 4A, 4B, 4C, and 4D are schematic views, each illustrating the sheet separating operation performed in the sheet laminator illustrated in FIG. 1.
Figure 4B:
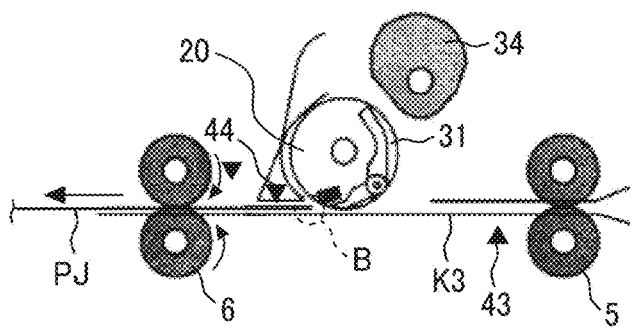
Figure 4C:
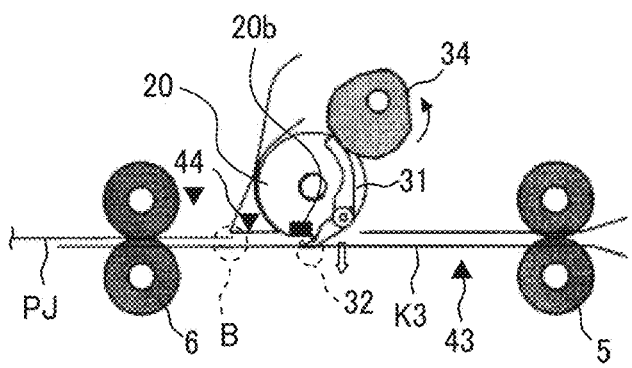
Figure 4D:
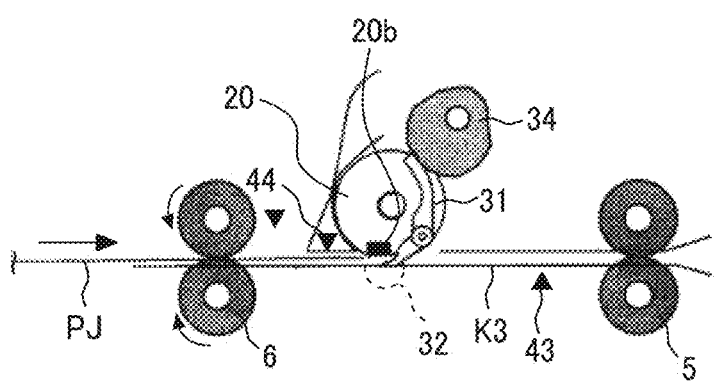

A description is given of the fourth sensor 44 in the sheet laminator 50 according to the present embodiment, with reference to FIGS. 1, 4D, and 5A.

The fourth sensor 44 functions as a sheet detection sensor to detect the two-ply sheet PJ conveyed between the winding roller 20 and the third conveyance roller pair 6. The fourth sensor 44 detects the leading end of the two-ply sheet PJ conveyed by the third conveyance roller pair 6 toward the winding roller 20 in the sheet conveyance direction. Based on the detection results detected by the fourth sensor 44, the controller 500 controls the moving mechanism 30.

To be more specific, the fourth sensor 44 is disposed in the sheet conveyance passage between the winding roller 20 and the third conveyance roller pair 6. As illustrated in FIGS. 4D and 5A, when the third conveyance roller pair 6 conveys the two-ply sheet PJ in the reverse direction toward the position of the winding roller 20 with the gripped portion B of the two-ply sheet PJ acting as the leading end, the fourth sensor 44 detects the leading end (that is, one end of the gripped portion B) of the two-ply sheet PJ conveyed in the reverse direction. The controller uses a timing at which the fourth sensor 44 detects the tip of one end of the gripped portion B as a trigger to adjust and control a timing to stop the two-ply sheet PJ at the gripping position and a timing at which the gripper 32 grips the gripped portion B. Specifically, after a given time has passed from the detection of the front end of the two-ply sheet PJ by the fourth sensor 44, the third conveyance roller pair 6 stops conveyance of the two-ply sheet PJ in the reverse direction, and the cam 34 rotates to pivot the arm 31 of the moving mechanism 30 so that the gripper 32 moves from the releasing position illustrated in FIG. 2B to the gripping position illustrated in FIG. 2A.

The above-described control accurately performs an operation in which the end face of the two-ply sheet PJ is nipped by the gripper 32 and the receiving portion 20b without contacting the end face of the two-ply sheet PJ on any member.

As described above, the third conveyance roller pair 6 is a sheet conveying roller pair that conveys the two-ply sheet PJ with the other end (the opposite end opposite the one end of the two-ply sheet PJ, i.e., the gripped portion B) as a leading end, toward the winding start position W of the winding roller 20 in the third sheet conveyance passage K3 (sheet conveyance passage) between the third conveyance roller pair 6 and the winding roller 20.

A description is given of the separation claws 16, each functioning as a separator, with reference to FIGS. 6A to 6C, 11, 12A to 12E, and 15.

Figure 7A:
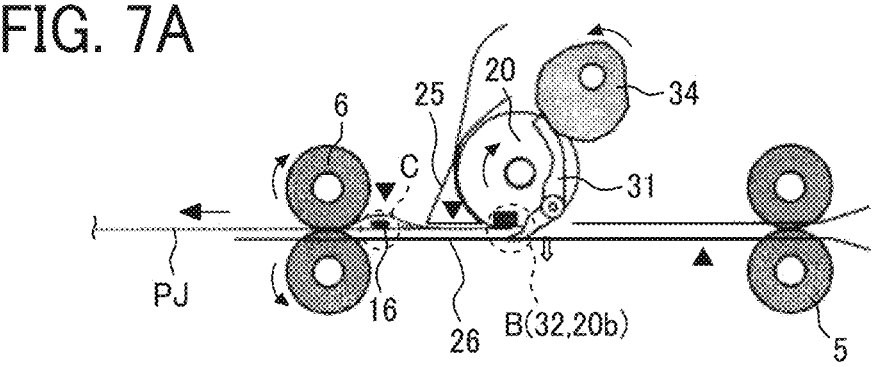
FIGS. 7A, 7B, and 7C are schematic views, each illustrating the sheet separating operation performed in the sheet laminator, subsequent from the sheet separating operation of each of FIGS. 6A, 6B, and 6C.
Figure 7B:
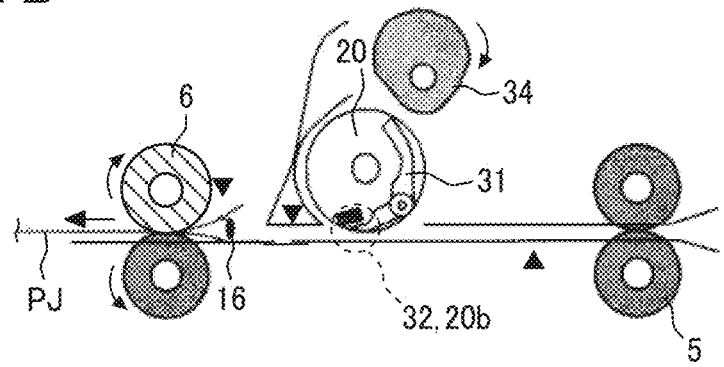
Figure 7C:
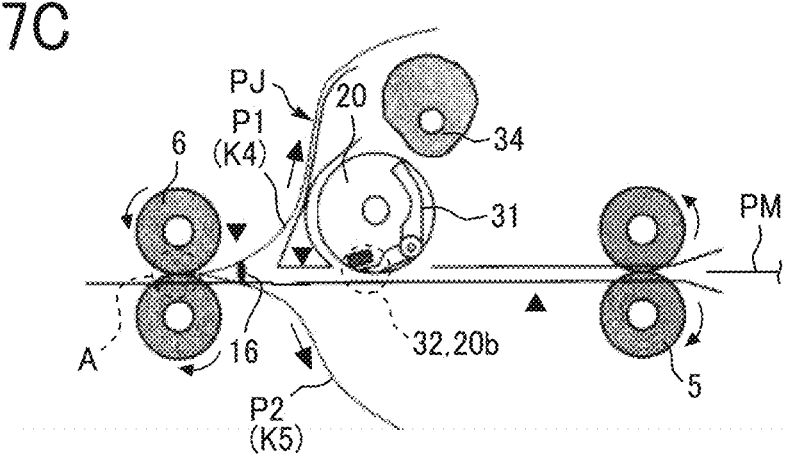

FIGS. 7A to 7C are schematic views, each illustrating the sheet separating operation performed in the sheet laminator, subsequent from the sheet separating operation of each of FIGS. 6A to 6C.

Figure 8A:
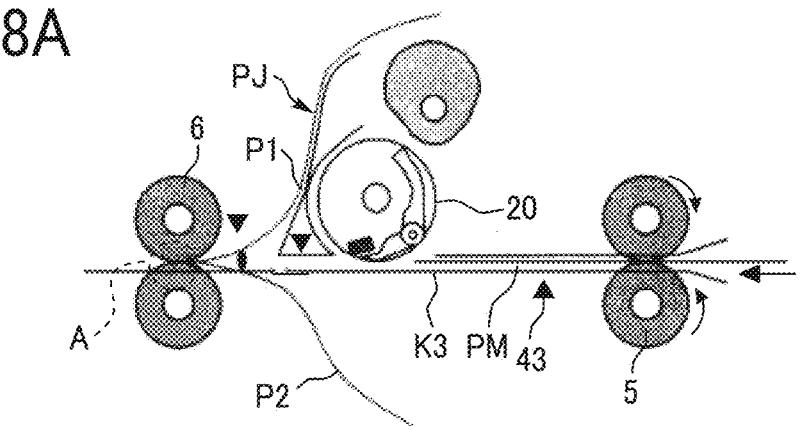
FIGS. 8A, 8B, and 8C are schematic views, each illustrating the sheet separating operation performed in the sheet laminator, subsequent from the sheet separating operation of each of FIGS. 7A, 7B, and 7C.
Figure 8B:
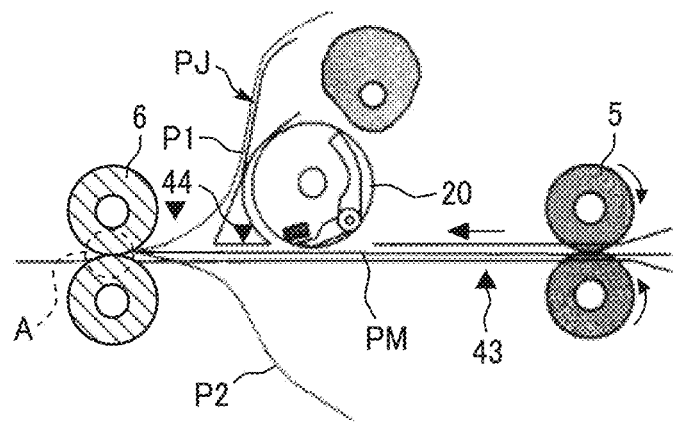
Figure 8C:
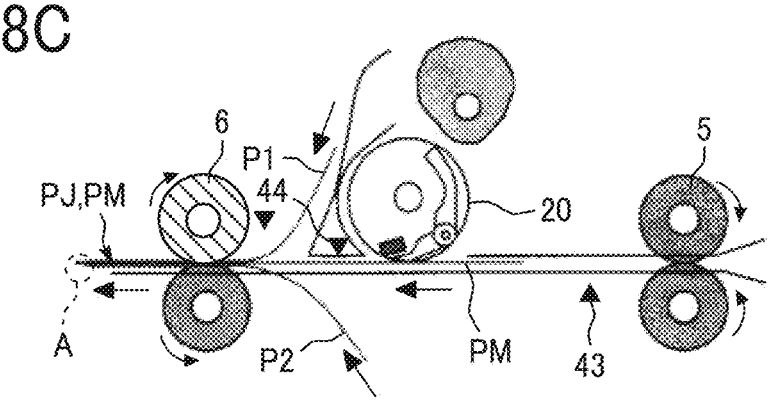

FIGS. 8A to 8C are schematic views, each illustrating the sheet separating operation performed in the sheet laminator, subsequent from the sheet separating operation of each of FIGS. 7A to 7C.

FIGS. 9A to 9D are schematic views, each illustrating the sheet separating operation performed in the sheet laminator, subsequent from the sheet separating operation of each of FIGS. 8A to 8C.

Figure 9A:
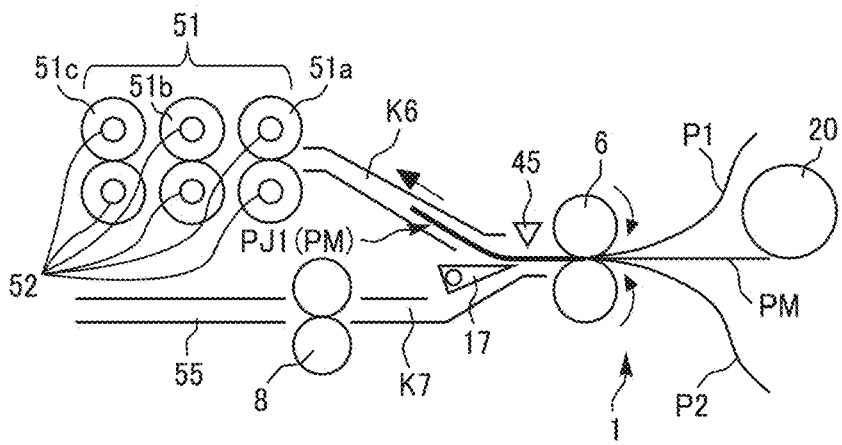
FIGS. 9A, 9B, 9C, and 9D are schematic views, each illustrating the sheet separating operation performed in the sheet laminator, subsequent from the sheet separating operation of each of FIGS. 8A, 8B, and 8C.
Figure 9B:
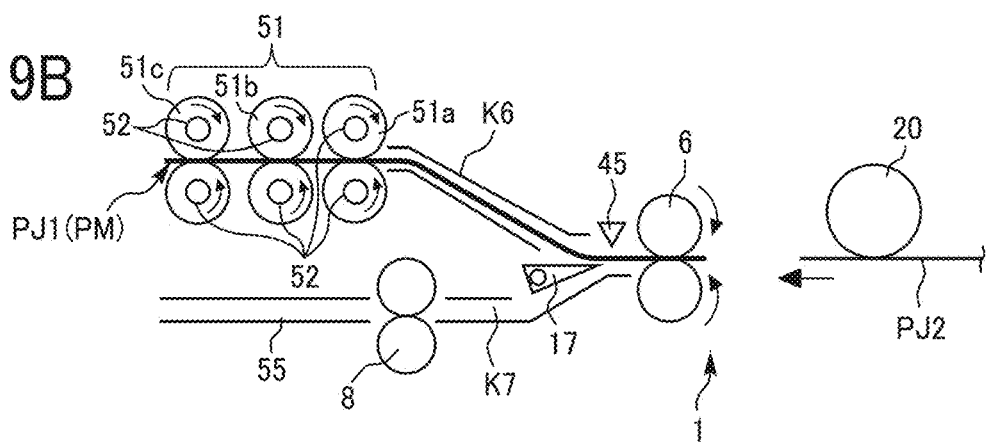
Figure 9C:
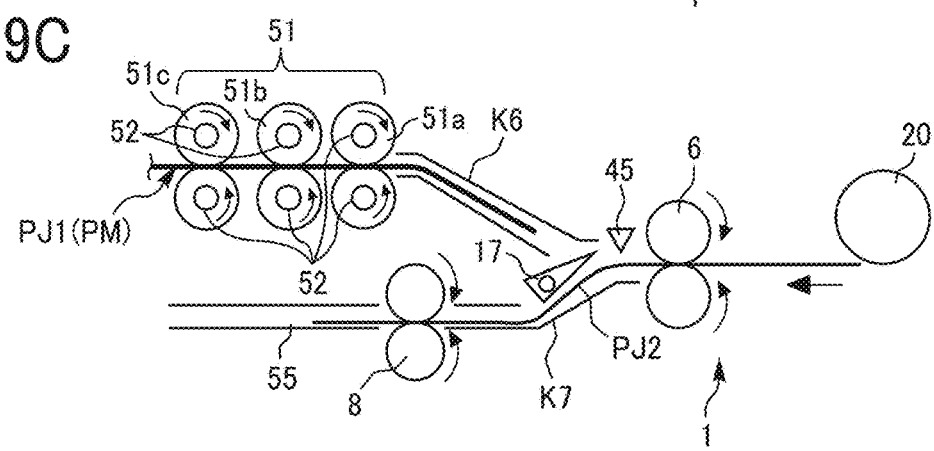
Figure 9D:
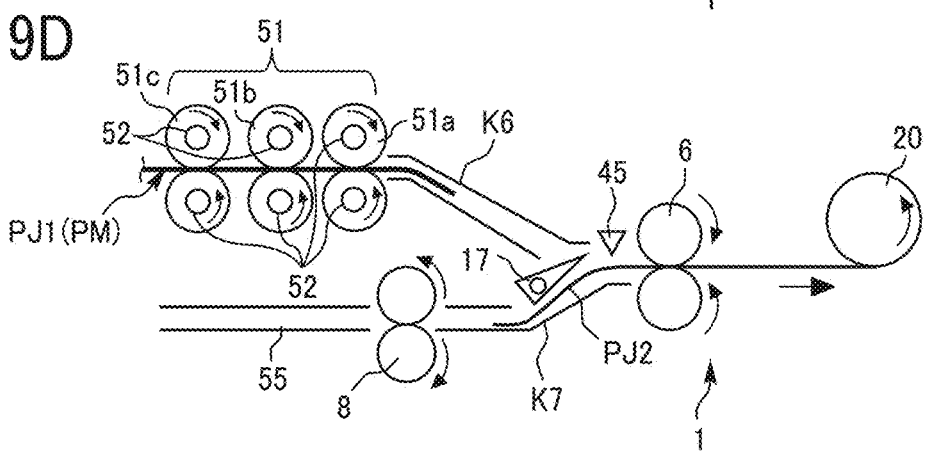
Figure 10A:
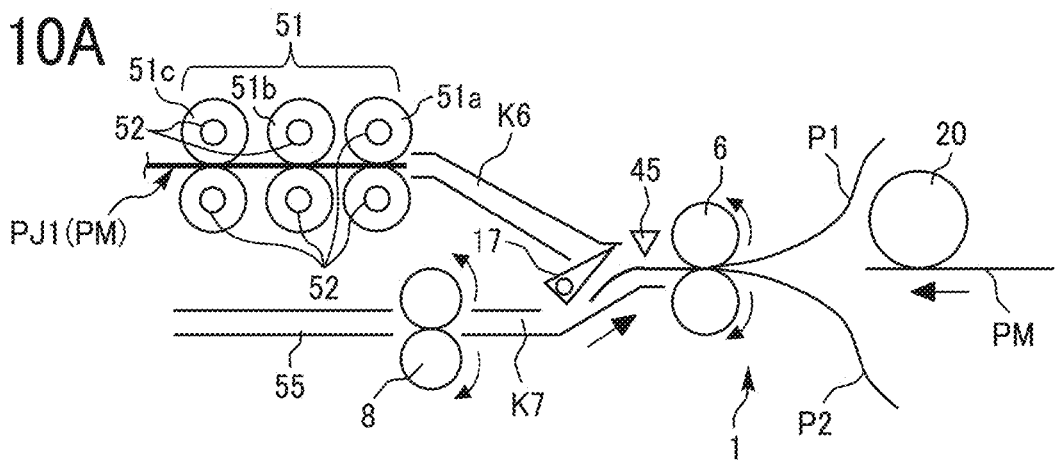
FIGS. 10A, 10B, and 10C are schematic views, each illustrating the sheet separating operation performed in the sheet laminator, subsequent from the sheet separating operation of each of FIGS. 9A, 9B, 9C, and 9D.
Figure 10B:
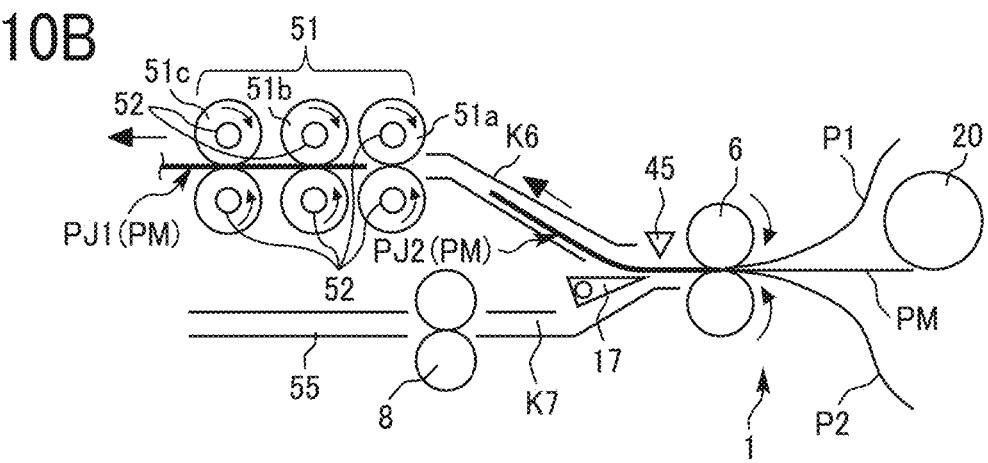
Figure 10C:
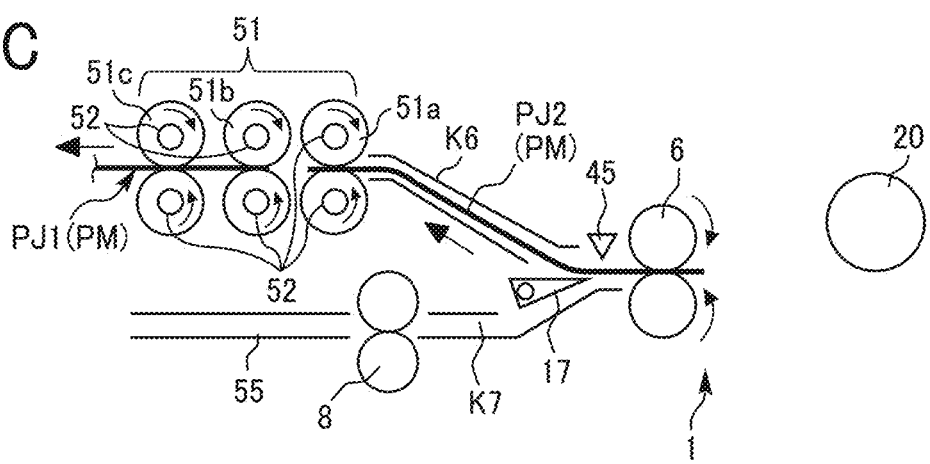

FIGS. 10A to 10C are schematic views, each illustrating the sheet separating operation performed in the sheet laminator, subsequent from the sheet separating operation of each of FIGS. 9A to 9D.

Figure 11:
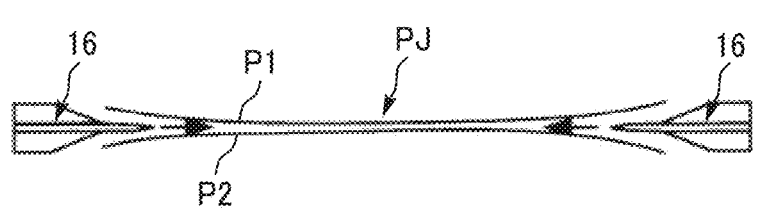
FIG. 11 is a schematic view of separation claws inserted into a two-ply sheet in a width direction of the two-ply sheet.

FIG. 11 is a schematic view of separation claws inserted into a two-ply sheet in a width direction of the two-ply sheet.

FIGS. 12A to 12E are perspective views, each illustrating the operation of the separation claws.

Figure 13A:
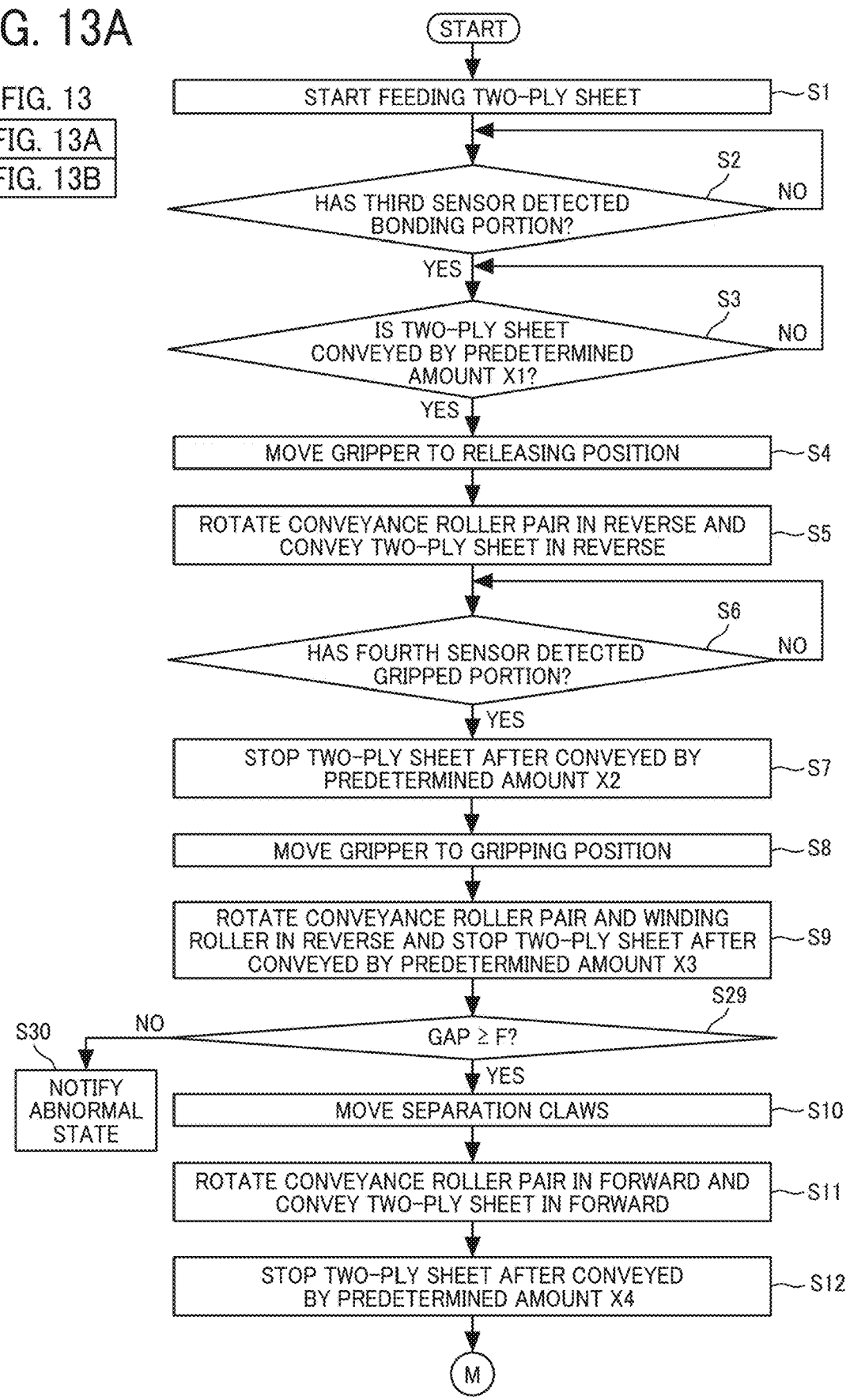
FIGS. 13A and 13B is a flowchart of a control process executed in the sheet laminator.
Figure 13B:
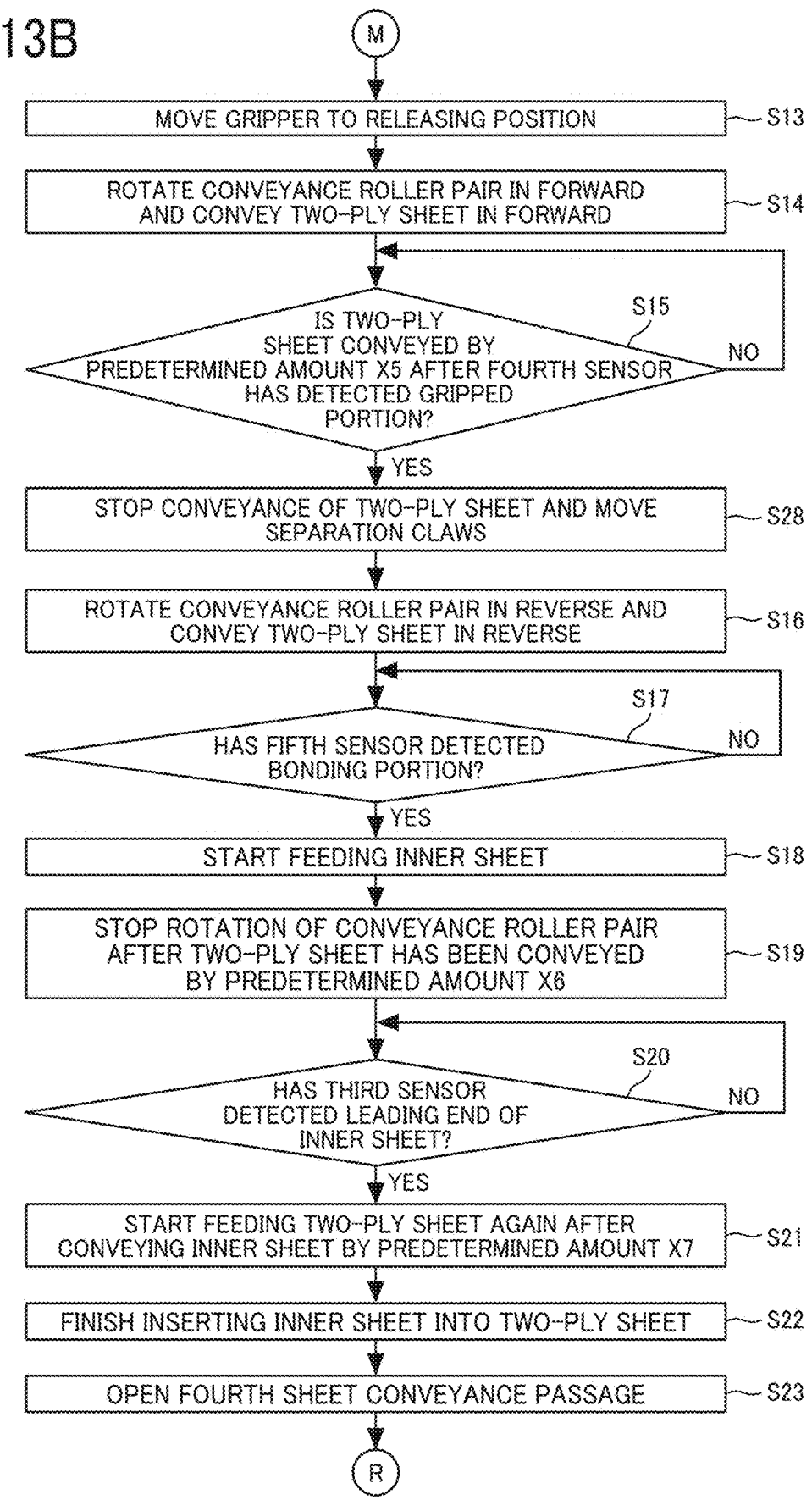

FIG. 13 including FIGS. 13A and 13B is a flowchart of a control process executed in the sheet laminator.

Figure 14:
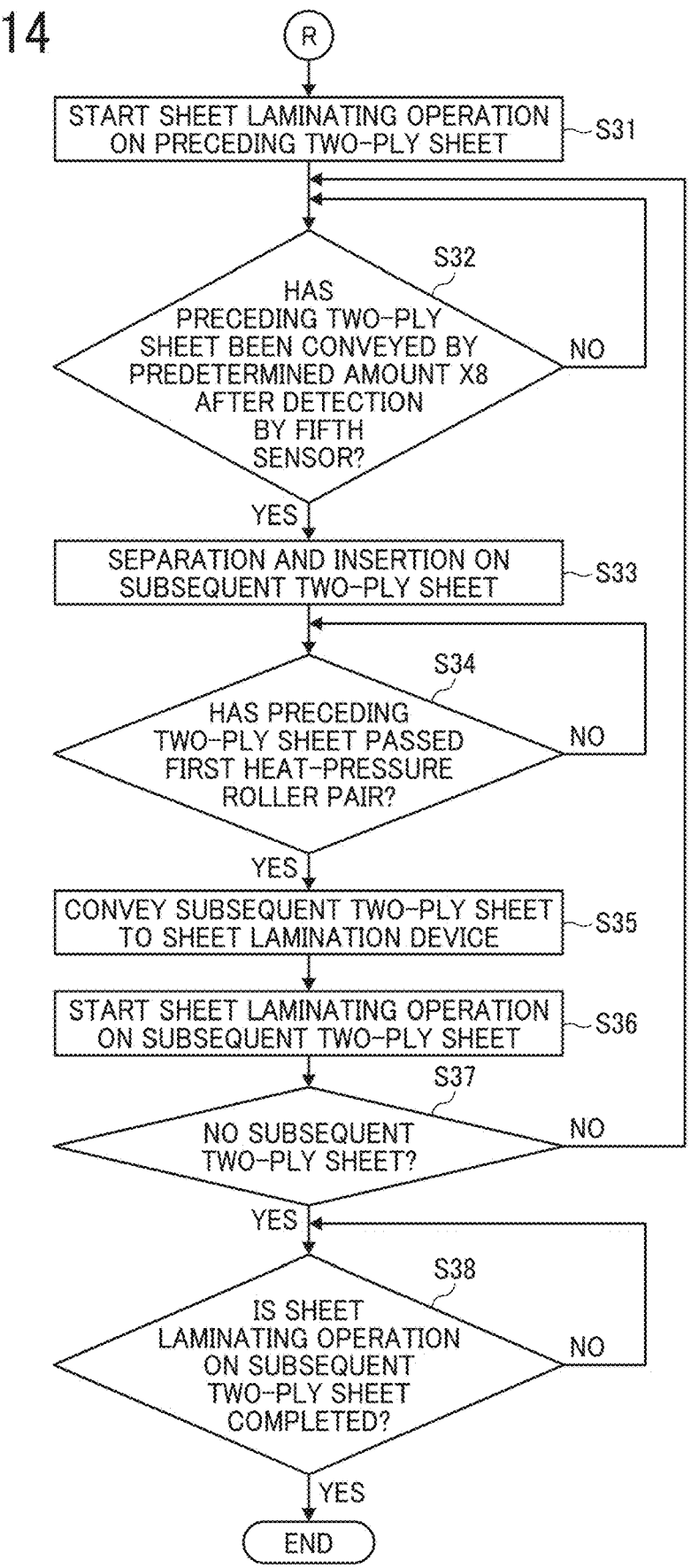
FIG. 14 is a flowchart of the control process subsequent from FIG. 13.

FIG. 14 is a flowchart of the control process subsequent from FIG. 13.

Figure 15:
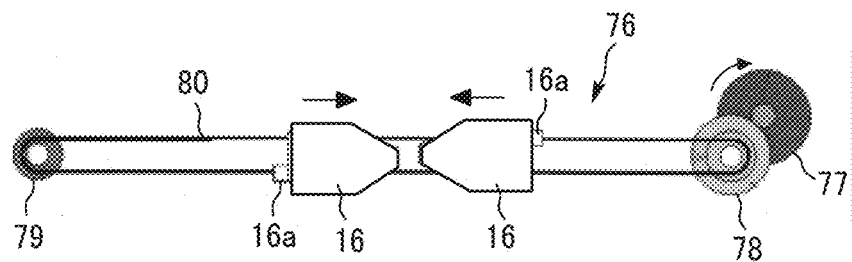
FIG. 15 is a schematic view of a moving mechanism to move the separation claws.

FIG. 15 is a schematic view of a moving mechanism to move the separation claws.

Figure 12A:
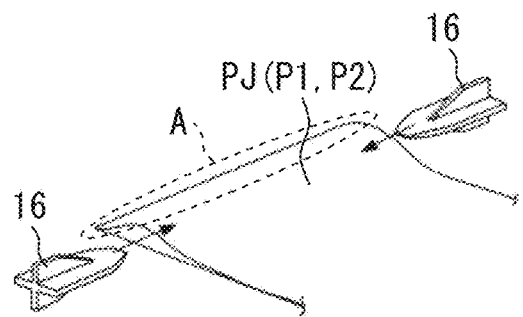
FIGS. 12A, 12B, 12C, 12D, and 12E are perspective views, each illustrating the operation of the separation claws.

Each of the separation claws 16 is a claw-shaped member that moves from the standby position illustrated in FIG. 12A and is inserted into the gap C formed between the first sheet P1 and the second sheet P2 of the two-ply sheet PJ at a given position of the two-ply sheet PJ.

To be more specific, the separation claws 16 are inserted into the gap C formed between the first sheet P1 and the second sheet P2 at a position between the winding roller 20 and the third conveyance roller pair 6 from the standby positions outside both ends of the two-ply sheet PJ in the width direction of the two-ply sheet PJ, with respect to the two-ply sheet PJ when the other end (that is the gripped portion B) is wound by the winding roller 20 and the one end (that is the bonding portion A) is nipped by the third conveyance roller pair 6.

More specifically, in the present embodiment, the separation claws 16 are a pair of separation claws that functions as a pair of separators disposed at both sides of the two-ply sheet PJ in the width direction that is the direction perpendicular to a plane on which FIGS. 6A to 6C are illustrated and the horizontal direction in FIGS. 11 and 15. As illustrated in FIGS. 12A to 12E, the vertical length of each of the separation claws 16 in the vertical direction (thickness direction) of the two-ply sheet PJ gradually increases from the front end of each of the separation claws 16 near the center in the width direction of the two-ply sheet PJ, to the rear end of each of the separation claws 16 near the outsides in the width direction of the two-ply sheet PJ. Further, the separation claws 16 are movable in the width direction of the two-ply sheet PJ by a driving device 76 (see FIG. 15) controlled by the controller 500.

Figure 12B:
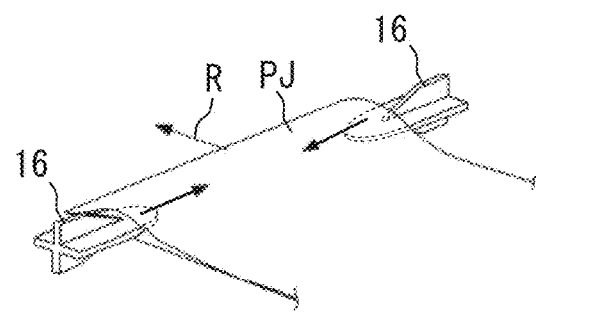

The separation claws 16 having the configuration as described above ordinarily stand by at respective standby positions at which the separation claws 16 do not interfere with conveyance of the sheet such as the two-ply sheet PJ in the third sheet conveyance passage K3. As illustrated in FIG. 12A, the standby positions of the separation claws 16 are outside of the two-ply sheet PJ (including the first sheet P1 and the second sheet P2) in the width direction of the two-ply sheet PJ. Subsequently, as illustrated in FIGS. 11 and 12B, the separation claws 16 enter the gap C in the two-ply sheet PJ when separating the two-ply sheet PJ (including the first sheet P1 and the second sheet P2). As a result, the separation claws 16 secure the gap C to be relatively large.

As illustrated in FIG. 15, the driving device 76 that moves the pair of separation claws 16 in the width direction includes a motor 77, a gear pulley 78, a pulley 79, and a timing belt 80. The gear pulley 78 has a step-like ring shape including a gear and a pulley. The gear meshes with the motor gear mounted on the motor shaft of the motor 77. The pulley stretches and supports the timing belt 80 together with the pulley 79. One separation claw 16 of the pair of separation claws 16 includes a fixed portion 16a that is fixed to a part of the belt surface of the timing belt 80 that is the upper side of the belt surface in FIG. 15. The other separation claw 16 includes a fixed portion 16a that is fixed to a part of the other belt surface of the timing belt 80 that is the lower side of the belt surface in FIG. 15.

In the driving device 76 having the configuration as described above, the motor 77 drives to rotate the motor shaft in a direction indicated by arrow in FIG. 15 (i.e. clockwise direction), the gear pulley 78 rotates counterclockwise, the timing belt 80 rotates in the counterclockwise direction, and the pair of separation claws 16 moves from the outside in the width direction of the two-ply sheet PJ to the center in the width direction of the two-ply sheet PJ (that is, the pair of separation claws 16 approaches each other). In contrast, when the motor 77 drives to rotate the motor shaft in the direction opposite to the arrow direction in FIG. 15, the pair of separation claws 16 moves from the center in the width direction of the two-ply sheet PJ toward the outside in the width direction of the two-ply sheet PJ (that is, the pair of separation claws 16 moves in a direction away from each other).

While the separation claws 16 are inserted into the gap C in the two-ply sheet PJ, the separation claws 16 relatively move from the one end of the two-ply sheet PJ near the bonding portion A to the other end of the two-ply sheet PJ near the gripped portion B. Then, the separation claws 16 move in the width direction between the first sheet P1 and the second sheet P2 at the other end of the two-ply sheet PJ.

Figure 12C:
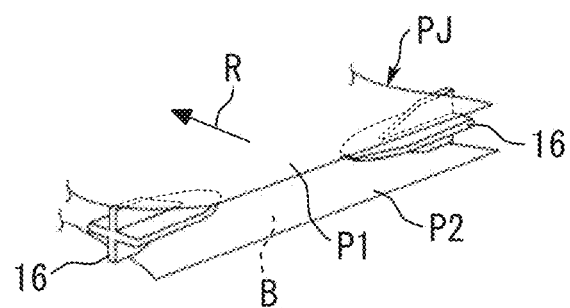
Figure 12D:
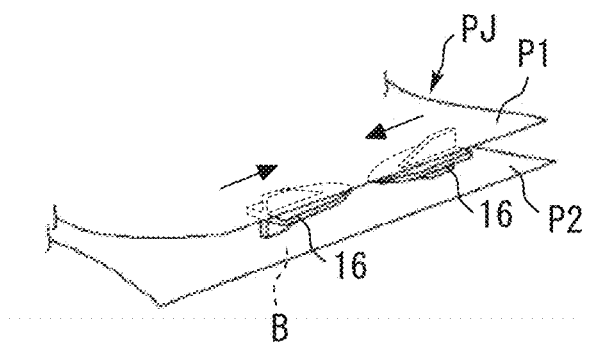

Specifically, the controller 500 controls the driving device 76 (see FIG. 15) to move the pair of separation claws 16 as follows. As illustrated in FIGS. 12B and 12C, the pair of separation claws 16 is inserted into both ends of the gap C in the two-ply sheet PJ in the width direction and relatively moves to the other end of the two-ply sheet PJ that is the gripped portion B. After the pair of separation claws 16 has relatively moved to the other end of the two-ply sheet PJ, as illustrated in FIG. 12D, the pair of separation claws 16 on the other end of the two-ply sheet PJ moves in the width direction from both ends of the two-ply sheet PJ to the center of the two-ply sheet PJ between the first sheet P1 and the second sheet P2. In order to cause the pair of separation claws 16 to move as described above, in the driving device 76, the pair of separation claws 16 can move from the standby positions to the positions at which the separation claws 16 come close to each other.

The above-described mechanism, which includes the winding roller 20 to wind the two-ply sheet PJ and the separation claws 16 to be inserted into the two-ply sheet PJ so as to separate the two-ply sheet PJ, reduces the size of the sheet separation device 1, when compared with a mechanism using a large-scale device such as a vacuum device to separate the two-ply sheet PJ. In other words, without increasing the size of the sheet laminator 50, the above-described mechanism preferably separates the first sheet P1 and the second sheet P2 of the two-ply sheet PJ.

In particular, since the separation claws 16 in the present embodiment move over substantially the entire area in the width direction of the two-ply sheet PJ on the other end of the two-ply sheet PJ (i.e., the trailing end of the two-ply sheet PJ), the separation claws 16 sufficiently separate (peel) the other ends of the first sheet P1 and the second sheet P2 of the two-ply sheet PJ, the other ends being opposite the bonding portion A. For this reason, it is less likely that the above-described configuration causes an inconvenience that the other end (that is opposite to the bonding portion A) of the two-ply sheet PJ is not sufficiently separated and that the inner sheet PM (see FIG. 12E) would not be inserted into the other end of the two-ply sheet PJ. Additionally, the above-described configuration allows the separation claws 16 to easily function as a switcher, in other words, to separately guide the first sheet P1 and the second sheet P2 to the first branched sheet conveyance passage K4 and the second branched sheet conveyance passage K5, respectively.

A description is given of the separation claws 16 each functioning as a switcher, with reference to FIGS. 7A to 12E.

In the present embodiment, the separation claws 16 functioning as a separator also function as a switcher that guides the first sheet P1 and the second sheet P2 separated by the separation claws 16, to the first branched sheet conveyance passage K4 and the second branched sheet conveyance passage K5 branching off in different directions, respectively (see FIG. 7C).

To be more specific, as illustrated in FIG. 7C, the first branched sheet conveyance passage K4 and the second branched sheet conveyance passage K5 branch off in different directions from the third sheet conveyance passage K3 between the winding roller 20 and each of the separation claws 16 (separator). To be more specific, the first branched sheet conveyance passage K4 branches upward from the third sheet conveyance passage K3, and the second branched sheet conveyance passage K5 branches downward from the third sheet conveyance passage K3.

As illustrated in FIGS. 7A to 7C, after the separation claws 16 are inserted into the gap C, the third conveyance roller pair 6 conveys the one end of the two-ply sheet PJ to the left side in FIGS. 7A to 7C so that the winding of the other end of the two-ply sheet PJ on the winding roller 20 is released (see FIG. 12A to FIG. 12C). After the winding of the other end of the two-ply sheet PJ on the winding roller 20 is released, the separation claws 16 move to the center in the width direction of the two-ply sheet PJ as illustrated in FIG. 12D and stop at the center in the width direction of the two-ply sheet PJ. Then, while the separation claws 16 remain at the center in the width direction of the two-ply sheet PJ, the third conveyance roller pair 6 conveys the other end of the two-ply sheet PJ to the right side in FIGS. 7A to 7C again. Thereafter, the separation claws 16 guide the first sheet P1 and the second sheet P2 separated by the separation claws 16, to the first branched sheet conveyance passage K4 and the second branched sheet conveyance passage K5, respectively. In other words, the controller 500 causes the separation claws 16 to guide the two sheets (i.e., the first sheet P1 and the second sheet P2) separated by the separation claws 16, to the two branched sheet conveyance passages (i.e., the first branched sheet conveyance passage K4 and the second branched sheet conveyance passage K5) separately. Consequently, the first sheet P1 is guided to the first branched sheet conveyance passage K4, and the second sheet P2 is guided to the second branched sheet conveyance passage K5. Subsequently, as illustrated in FIGS. 8A to 8C and 12E, the separation claws 16 move to the standby positions, and the second conveyance roller pair 5 conveys the inner sheet PM to the one end of the third sheet conveyance passage K3, that is, the right side in FIGS. 8A to 8C, to insert the inner sheet PM between the first sheet P1 and the second sheet P2 separated from the two-ply sheet PJ.

As described above, each of the separation claws 16 in the present embodiment functions as a separator that separates (in other words, peels) the non-bonding portion of the first sheet P1 and the second sheet P2 of the two-ply sheet PJ, and also functions as a switcher that separately guides the separated two sheets, which are the first sheet P1 and the second sheet P2, to the first branched sheet conveyance passage K4 and the second branched sheet conveyance passage K5, respectively. Accordingly, the above-described configuration reduces the size and cost of the sheet laminator 50, when compared with the configuration of a sheet separation device including the separator and the switcher as different units. In other words, the above-described configuration efficiently and preferably can separate the first sheet P1 and the second sheet P2 of the two-ply sheet PJ.

The seventh sensor 47 optically detects that the first sheet P1 separated apart from the second sheet P2 is successfully conveyed to the first branched sheet conveyance passage K4. Further, the eighth sensor 48 optically detects that the second sheet P2 separated apart from the first sheet P1 is successfully conveyed to the second branched sheet conveyance passage K5.

Note that each separation claw 16 in the present embodiment functions as a separator and a switcher. However, the sheet separation device 1 according to the present embodiment may further include a member that functions as a switcher, different from the separation claw 16 that functions as a separator.

A description is given of a first guide 25 provided in the sheet separation device 1 according to the present embodiment, with reference to, for example, FIGS. 6A and 6C.

The first guide 25 is disposed between the separation claws 16 and the winding roller 20 in the third sheet conveyance passage K3. The first guide 25 functions as a limiter to limit an amount of slack (in other words, a deflection amount) of the first sheet P1 that is wound around the winding roller 20 on the inner side of the first sheet P1 and the second sheet P2 of the two-ply sheet PJ wound around the winding roller 20.

To be more specific, the first guide 25 that functions as a limiter is a conveyance guide disposed on the side in which the winding roller 20 is disposed with respect to an imaginary plane S1, that is, above the imaginary plane S1 in FIG. 6A, in the third sheet conveyance passage K3. The imaginary plane S1 (see FIG. 6A) is an imaginary plane passing through the winding start position W of the winding roller 20 and the nip region of the third conveyance roller pair 6 in the third sheet conveyance passage K3. The first guide 25 has a shape like a triangular prism having a plane along the outer circumferential surface of the winding roller 20, and the plane covers a part of the outer circumferential surface of the winding roller 20 and is separated from the winding roller 20 by a predetermined gap. The first guide 25 functions as a conveyance guide of the third conveyance path K3 and a conveyance guide of the first branched conveyance path K4. In other words, the first guide 25 guides the sheet conveyed through the third sheet conveyance passage K3, the sheet conveyed through the first branched sheet conveyance passage K4, and the sheet wound around the winding roller 20.

In particular, in the third sheet conveyance passage K3, the first guide 25 limits bending the two-ply sheet PJ upward (in particular, bending the first sheet P1 upward) between the winding roller 20 and the third conveyance roller pair 6. Due to such a configuration, the gap C in the two-ply sheet PJ that is mainly formed by bending the first sheet P1 upward is intensively formed between the first guide 25 and the third conveyance roller pair 6. Accordingly, the above-described configuration increases the size of the gap C even if the winding amount of the two-ply sheet PJ wound around the winding roller 20 is not large, and the separation claws 16 smoothly enter the gap C to separate the two-ply sheet PJ.

A description is given of a second guide 26 provided in the sheet separation device 1 according to the present embodiment, with reference to, for example, FIGS. 6A and 6C.

The second guide 26 is disposed between the separation claws 16 and the winding roller 20 in the third sheet conveyance passage K3. The second guide 26 functions as a guide to guide the second sheet P2 that is an outer sheet of the two sheets P1 and P2 of the two-ply sheet PJ wound around the winding roller 20.

To be more specific, the second guide 26 that functions as a guide is a sheet conveyance guide disposed on the side in which the winding roller 20 is not disposed with respect to the imaginary plane S1, that is, below the imaginary plane S1 in FIG. 6A, in the third sheet conveyance passage K3. The second guide 26 is disposed to face the lower face of the sheet from a portion close and upstream from the second conveyance roller pair 5 in the forward direction to a portion close and downstream from the third conveyance roller pair 6 in the forward direction. In other words, the second guide 26 guides the sheet conveyed in the third sheet conveyance passage K3.

In particular, in the third sheet conveyance passage K3 between the winding roller 20 and the third conveyance roller pair 6, a clearance between the first guide 25 and the second guide 26 is set to be a value by which the sheet having the largest thickness is conveyed. Since this setting limits a gap between the first sheet P1 and the second sheet P2 of the two-ply sheet PJ so as not to be too large between the first guide 25 and the second guide 26, the gap C in the two-ply sheet PJ that is mainly formed by bending the first sheet P1 upward is intensively formed. Accordingly, the separation claws 16 smoothly enter the gap C to separate the two-ply sheet PJ.

A description is given of the sixth sensor 46, with reference to, for example, FIG. 6A.

The sixth sensor 46 functions as an abnormality detection sensor or an abnormality detector to detect an abnormal state in which the gap C formed between the first sheet P1 and the second sheet P2 at a predetermined position (that is, a position between the third conveyance roller pair 6 and the winding roller 20) is not larger than a predetermined size before the separation claws 16 move from the standby positions, to be more specific, before the separation claws 16 move from the standby positions illustrated in FIG. 15 to the separation positions illustrated in FIGS. 11 and 12A. The predetermined size is the size of the gap C into which the separation claws 16 enter, which is determined by experiments. In other words, the sixth sensor 46 that functions as the abnormality detector detects the abnormal state in which the gap C formed between the first sheet P1 and the second sheet P2 at a predetermined position is not larger than the predetermined size before the separation claws 16 are inserted into the gap C.

In other words, at a timing at which the gap C is formed between the first sheet P1 and the second sheet P2, as illustrated in FIGS. 5D and 6A, the sixth sensor 46 that functions as the abnormality detector detects the abnormal state such as a state in which the gap is not formed at all or a state in which the gap is not formed as a sufficient gap C.

In the present embodiment, the controller 500 notifies occurrence of an abnormal state when the abnormal state is detected by the sixth sensor 46 (abnormality detector). To be more specific, as illustrated in FIG. 1, the sheet laminator 50 includes an operation display panel 49 that functions as an operation display device on the exterior of the sheet laminator 50 to display various kinds of information about the sheet laminator 50 and input various kinds of commands. When the controller 500 determines the abnormal state based on the results detected by the sixth sensor 46, that is, when the two-ply sheet PJ does not have the sufficiently large gap C, the controller 500 controls the operation display panel 49 to display that the abnormal state is detected. For example, the operation display panel 49 displays "Since an abnormality has occurred, the process of inserting the inner sheet is stopped. Please check the setting direction of the two-ply sheet in the unit sheet feed tray. If the setting direction is correct and similar abnormalities are repeated, please contact a service person."

The above-described sixth sensor 46 that functions as the abnormality detector may be, for example, a lever type sensor that comes into contact with the upper first sheet P1 of the two-ply sheet PJ forming the gap C larger than the predetermined size.

A description is given of the sheet laminating operation on a plurality of two-ply sheets PJ in the sheet laminator 50 according to the present embodiment, with reference to FIGS. 9A to 10C.

As illustrated in FIGS. 9A to 10C, the sheet laminator 50 performs the sheet laminating operation on a plurality of two-ply sheets PJ including a preceding two-ply sheet PJ1 and a subsequent two-ply sheet PJ2. When the sheet lamination device 51 is performing the sheet laminating operation on the preceding two-ply sheet PJ1, the sheet separation device 1 that performs the sheet separating operation and the sheet inserting operation performs at least the sheet separating operation on the subsequent two-ply sheet PJ2.

In other words, in the present embodiment, when continuously performing the sheet laminating operation on each of the plurality of two-ply sheets PJ (i.e., the preceding two-ply sheet PJ1 and the subsequent two-ply sheet PJ2), the sheet laminator 50 according to the present embodiment does not start the sheet separating operation on the subsequent two-ply sheet PJ2 after completely finishing the sheet laminating operation on the preceding two-ply sheet PJ1 but starts the sheet separating operation on the subsequent two-ply sheet PJ2 while the sheet lamination device 51 is performing the sheet laminating operation on the preceding two-ply sheet PJ1. This sheet laminating operation continuously performed on the plurality of two-ply sheets may hereinafter be referred to as a continuous sheet laminating operation. Further, in other words, the sheet laminator 50 according to the present embodiment narrows down the gap (space) between the preceding two-ply sheet PJ1 and the subsequent two-ply sheet PJ2 in the sheet conveyance direction to perform the continuous sheet laminating operation.

For this reason, the time to finish the whole sheet laminating operation (series of jobs) on the plurality of two-ply sheets PJ is reduced, thereby enhancing the productivity of the sheet laminator 50.

In particular, in the present embodiment, as illustrated in FIGS. 9C, 9D, and 10A, when the sheet separation device 1 performs the sheet separating operation on the subsequent two-ply sheet PJ2 in the continuous sheet laminating operation, the switching claw 17 that functions as a switcher is controlled to be in the second state in which the fourth sheet conveyance passage K6 is closed and the retract sheet conveyance passage K7 is open. In other words, when the sheet separation device 1 performs the sheet separating operation on the subsequent two-ply sheet PJ2, the fourth sheet conveyance passage K6 is closed and the retract sheet conveyance passage K7 is open.

Accordingly, when compared with a configuration in which the retract sheet conveyance passage K7 is not provided and the continuous sheet laminating operation is performed by using the fourth sheet conveyance passage K6 alone, even if the length of the fourth sheet conveyance passage K6 (in the sheet conveyance direction) is shortened, in other words, even if the size of the sheet laminator 50 is reduced, the configuration according to the present embodiment can prevent the inconvenience that the subsequent two-ply sheet PJ2 interferes the preceding two-ply sheet PJ1.

Note that the control of changing the position of the switching claw 17 is performed by the fifth sensor 45 disposed proximate to the branching point of the fourth sheet conveyance passage K6 and the retract sheet conveyance passage K7, in response to the detection of the trailing end of the preceding two-ply sheet PJ1.

As illustrated in FIGS. 10A to 10C, the continuous sheet laminating operation in the present embodiment is controlled that the trailing end of the preceding two-ply sheet PJ1 passes the extreme upstream portion of the sheet lamination device 51 (that is, the nip region formed between the rollers of a first heat-pressure roller pair 51a that is disposed extreme upstream side of the sheet lamination device 51 in the sheet conveyance direction), and then the leading end of the subsequent two-ply sheet PJ2 enters the extreme upstream portion (i.e., the nip region of the first heat-pressure roller pair 51a).

Due to such a configuration, the continuous sheet laminating operation is performed when the gap (space) between the preceding two-ply sheet PJ1 and the subsequent two-ply sheet PJ2 is further reduced (narrowed). As a result, the time to finish the entire sheet laminating operation (series of jobs) on the plurality of two-ply sheets PJ is reduced, thereby enhancing the productivity of the sheet laminator 50.

A description is given of the operations performed in the sheet laminator 50 when the sheet laminating operation is continuously performed on the plurality of two-ply sheets PJ, with reference to FIGS. 4A to 10C.

In the description of the operations, the operations of the separation claws 16 are appropriately described with reference to FIGS. 11 to 12E and the control flow is appropriately described with reference to a flowchart of FIG. 13 including FIGS. 13A and 13B and FIG. 14.

First, the first feed roller 2 and the first conveyance roller pair 4 start feeding the two-ply sheet PJ (i.e., the preceding two-ply sheet PJ1) from the first feed tray 11 in step S1 of FIG. 13A. Then, as illustrated in FIG. 4A, the second conveyance roller pair 5 conveys the two-ply sheet PJ with the bonding portion A as the leading end of the two-ply sheet PJ in the forward direction that is a direction from the right side to the left side in FIGS. 4A to 4D in the third sheet conveyance passage K3.

At this time, the controller 500 causes the moving mechanism 30 to position the gripper 32 at the gripping position.

In other words, the cam 34 moves to a rotational position at which the cam 34 does not press the arm 31. When the gripper 32 is positioned at the gripping position as described above, the gripper 32 does not block conveyance of the sheet in the third sheet conveyance passage K3. The separation claws 16 stand by at the standby positions (illustrated in FIG. 12A) at which the separation claws 16 cannot block conveyance of the sheet in the third sheet conveyance passage K3.

Then, as illustrated in FIG. 4B, the controller 500 determines whether the third sensor 43 has detected the bonding portion A of the two-ply sheet PJ (i.e., the leading end of the two-ply sheet PJ conveyed in the forward direction, in other words, the one end of the two-ply sheet PJ), in step S2 of FIG. 13A. When the third sensor 43 has not detected the bonding portion A of the two-ply sheet PJ (NO in step S2 of FIG. 13A), step S2 is repeated until the third sensor 43 detects the bonding portion A of the two-ply sheet PJ. By contrast, when the third sensor 43 has detected the bonding portion A of the two-ply sheet PJ (YES in step S2 of FIG. 13A), in response to the timing of detection of the bonding portion A of the two-ply sheet PJ by the third sensor 43, the controller 500 causes the third conveyance roller pair 6 to convey the two-ply sheet PJ in the forward direction by a predetermined amount X1 until the gripped portion B of the two-ply sheet PJ (i.e., the trailing end of the two-ply sheet PJ conveyed in the forward direction, in other words, the other end of the two-ply sheet PJ) passes the position of the winding roller 20, in step S3 of FIG. 13A. Note that, in a case in which the two-ply sheet PJ is the subsequent two-ply sheet PJ2 (in other words, the second or other two-ply sheet after the first two-ply sheet) in the continuous sheet laminating operation in the above-described state, the switching claw 17 (see FIGS. 9A to 9C) is rotated to the position to close the fourth sheet conveyance passage K6 and open the retract sheet conveyance passage K7).

As illustrated in FIG. 4C, the controller 500 causes the third conveyance roller pair 6 to temporarily stop conveyance of the two-ply sheet PJ conveyed by the predetermined amount X1 and causes the gripper 32 to move from the gripping position to the releasing position in step S4 of FIG. 13A. In other words, the controller causes the cam 34 to move to a rotational position at which the cam 34 pushes the arm 31. In this state, the gripped portion B of the two-ply sheet PJ can be received between the gripper 32 and the receiving portion 20b.

Then, as illustrated in FIG. 4D, the controller 500 causes the third conveyance roller pair 6 to rotate in the reverse direction to start conveyance of the two-ply sheet PJ in the reverse direction in step S5 of FIG. 13A. At this time, the fourth sensor 44 detects the gripped portion B of the two-ply sheet PJ, that is, the other end of the two-ply sheet PJ and the leading end of the two-ply sheet PJ conveyed in the reverse direction.

Subsequently, the controller 500 determines whether the fourth sensor 44 has detected the gripped portion B of the two-ply sheet PJ, in step S6 of FIG. 13A. When the fourth sensor 44 has not detected the gripped portion B (NO in step S6 of FIG. 13A), step S6 is repeated until the fourth sensor 44 detects the gripped portion B of the two-ply sheet PJ. By contrast, when the fourth sensor 44 has detected the gripped portion B (YES in step S6 of FIG. 13A), as illustrated in FIG. 5A, in response to detection of the gripped portion B of the two-ply sheet PJ by the fourth sensor 44, the controller 500 causes the third conveyance roller pair 6 to convey the two-ply sheet PJ by a predetermined amount X2 until the gripped portion B of the two-ply sheet PJ reaches the position of the winding roller 20, that is, the winding start position W. Then, the controller 500 causes the third conveyance roller pair 6 to stop conveyance of the two-ply sheet PJ, in step S7 of FIG. 13A.

Then, as illustrated in FIG. 5B, the gripper 32 is moved from the releasing position to the gripping position while the gripped portion B of the two-ply sheet PJ is at the winding start position W, in step S8 of FIG. 13A. In other words, the controller 500 causes the cam 34 to move to a rotational position at which the cam 34 does not press the arm 31. While the cam 34 is at the rotational position, as illustrated in FIG. 5B', the end face of the other end of the two-ply sheet PJ does not contact any member, and the gripped portion B of the two-ply sheet PJ is gripped between the gripper 32 and the receiving portion 20b.

Then, as illustrated in FIG. 5C, the winding roller 20 rotates in the reverse direction (that is, the counterclockwise direction) while the gripper 32 grips the two-ply sheet PJ, and the third conveyance roller pair 6 rotates again in the reverse direction together with the winding roller 20. At this time, as the winding roller 20 rotates, the gap C is formed between the first sheet P1 and the second sheet P2 of the two-ply sheet PJ in the area between the winding roller 20 and the third conveyance roller pair 6, as illustrated in FIG. 5D. As the gap C is formed, the first guide 25 and the second guide 26 limit the warp (slack) of the two-ply sheet PJ in the vicinity of the winding roller 20. As a result, the gap C of the two-ply sheet PJ is intensively formed near the third conveyance roller pair 6.

Since the controller 500 determines the timing at which the gripper 32 and the receiving portion 20b grip the gripped portion B of the two-ply sheet PJ in response to the timing of detection of the leading end of the two-ply sheet PJ conveyed in the reverse direction by the fourth sensor 44 disposed downstream from the third conveyance roller pair 6 in the reverse direction, the gripped portion B of the two-ply sheet PJ can be accurately conveyed to a desired gripping position regardless of variations in the sheet lengths with respect to the sheet conveyance amount X2. Note that the size of sheets includes an error even if the sheets are sold as the same size.

Further, by detecting the leading end of the two-ply sheet PJ conveyed in the reverse direction by the fourth sensor 44, the sheet conveyance amount X2 that is measured according to the detection can be reduced regardless of the sheet length. For this reason, the above-described configuration can reduce variation in the sheet conveyance amount X2 and can accurately convey the gripped portion B of the two-ply sheet PJ to the desired gripping position.

Accordingly, the fourth sensor 44 is preferably disposed near the winding roller 20.

With reference to FIG. 5C', the above description was given of a mechanism that generates the gap C in the two-ply sheet PJ. As described above, the gap C is generated in the two-ply sheet PJ between the winding roller 20 and the third conveyance roller pair 6 by winding the two-ply sheet PJ around the winding roller 20.

The detailed description is given the mechanism as follows.

The two-ply sheet PJ wound around the winding roller 20 is gripped by the gripper 32, restricting misalignment in the sheet. Due to this configuration, a slip is generated between the first sheet P1 and the second sheet P2 by the amount of the circumferential length of the winding roller 20. Due to the slip, the conveyance amount of the inner sheet (i.e., the first sheet P1) is smaller than the conveyance amount of the outer sheet (i.e., the second sheet P2). As a result, warp (slack) is generated in the inner sheet (i.e., the first sheet P1) between the nip region of the third conveyance roller pair 6 and the winding roller 20. At this time, as the two-ply sheet PJ is wound around the winding roller 20 by one or more rounds, the difference in the winding circumferential length is generated between the inner circumference and the outer circumference by the thickness of the sheet. As a result, the warp (slack) is additionally generated.

To be more specific, a distance from the rotary shaft 20a (i.e., the axial center) of the winding roller 20 to the second sheet P2 on the outer side of the winding roller 20 is $R+\Delta R$, where a distance from the rotary shaft 20a (i.e., the axial center) of the winding roller 20 to the first sheet P1 on the inner side of the winding roller 20 is "R" and the thickness of the inner sheet (first sheet P1) is "$\Delta R$". Since the radius of the first sheet P1 wound around the inner side of the winding roller 20 and the radius of the second sheet P2 wound around the outer side of the first sheet P1 are different by the thickness $\Delta R$ of the first sheet P1 (wound around the inner side of the winding roller 20), a circumferential length difference of $2 \times \Delta R \times \pi$ is generated between the inner sheet (first sheet P1) and the outer sheet (second sheet P2) when the two-ply sheet PJ is wound around the winding roller 20 by one round. As a result, when the number of winding the two-ply sheet PJ around the winding roller 20 is M times, the slack of the inner sheet (first sheet P1) is generated by the circumferential length difference of $2 \times \Delta R \times \pi \times M$.

Finally, the warp (slack) is accumulated between the third conveyance roller pair 6 and the winding roller 20, and the gap C corresponding to $2 \times \Delta R \times \pi \times M$ is formed between the first sheet P1 and the second sheet P2.

Then, the controller 500 causes the third conveyance roller pair 6 and the winding roller 20 to rotate in the reverse direction. At the timing at which the third conveyance roller pair 6 has conveyed the two-ply sheet PJ by a predetermined amount X3 since the start of winding of the two-ply sheet PJ by the winding roller 20, the controller 500 causes the third conveyance roller pair 6 to stop conveyance of the two-ply sheet PJ and the winding roller 20 to stop winding the two-ply sheet PJ, as illustrated in FIG. 6A, in step S9 of FIG. 13A. While the conveyance and winding of the two-ply sheet PJ are stopped, the two-ply sheet PJ is wound around the winding roller 20 one or more times, and the gap C in the two-ply sheet PJ (i.e., the distance between the first sheet P1 and the second sheet P2 in the vertical direction) is sufficiently widened if the two-ply sheet PJ is normally separated.

When the gap C is sufficiently widened, the controller 500 determines whether the sixth sensor 46 detects that the gap C equal to or greater than a predetermined distance F is formed in the two-ply sheet PJ, in step S29 of FIG. 13A.

As a result, when the controller 500 determines that the gap C is the sufficient gap that is equal to or greater than the predetermined distance F, the controller 500 determines that the subsequent sheet separating operations of the separation claws 16 is successfully performed and controls the separation claws 16 to insert into the gap C sufficiently widened in the two-ply sheet PJ, as illustrated in FIG. 6B, in step S10 of FIG. 13A. In other words, as illustrated in FIGS. 11 and 12A, each of the separation claws 16 in pair is moved from the standby position to the separation position.

Then, as illustrated in FIG. 6C, the third conveyance roller pair 6 and the winding roller 20 start rotating in the forward direction, in other words, in the clockwise direction, so that the two-ply sheet PJ is conveyed in the forward direction, in step S11 of FIG. 13A, while the separation claws 16 are inserted in the gap C. In other words, as illustrated in FIGS. 12A to 12C, the separation claws 16 that are inserted in the gap C of the two-ply sheet PJ relatively move from the one end (bonding portion A) to the other end (gripped portion B) with respect to the two-ply sheet PJ. Note that the above-described relative movement in the present embodiment is achieved by moving the two-ply sheet PJ itself in a direction indicated by arrow in FIGS. 12A to 12C, without changing the positions of the separation claws 16 in the sheet conveyance direction.

Note that, when the controller 500 determines that the gap C in the two-ply sheet PJ is not the sufficient gap that is equal to or greater than the predetermined distance F (NO in step S29 of FIG. 13A), in other words, when the controller 500 determines that the abnormal state occurs based on the results detected by the sixth sensor 46, the controller 500 determines that the subsequent sheet separating operations of the separation claws 16 cause various kinds of inconveniences, and therefore does not move the separation claws 16 from the standby positions to the separation positions. At this time, the controller 500 causes the operation display panel 49 (see FIG. 1) to notify a user or users that the occurrence of the abnormal state stops the sheet separating operation of the two-ply sheet PJ and the sheet inserting operation of the inner sheet PM, in step S30 of FIG. 13A.

Thereafter, as illustrated in FIG. 7A, after the third conveyance roller pair 6 has conveyed the two-ply sheet PJ in the forward direction by a predetermined amount X4, the controller 500 causes the third conveyance roller pair 6 and the winding roller 20 to stop rotating in the forward direction, in step S12 of FIG. 13B. At this time, the gripped portion B of the two-ply sheet PJ is positioned on the third sheet conveyance passage K3, in other words, the gripped portion B of the two-ply sheet PJ is at the winding start position W illustrated in FIG. 5B. In this state, the gripper 32 may release the gripped portion B. In addition, as illustrated in FIG. 12C, the separation claws 16 stop near the other end of the two-ply sheet PJ after the separation claws 16 are inserted into the gap C of the two-ply sheet PJ and relatively move to the other end (gripped portion B) of the two-ply sheet PJ with respect to the two-ply sheet PJ.

While the separation claws 16 stop near the other end of the two-ply sheet PJ, the gripper 32 moves from the gripping position to the releasing position in step S13 of FIG. 13B. In other words, the controller 500 causes the cam 34 to move to the rotational position at which the cam 34 does not press the arm 31. While the cam 34 is at the rotational position, the gripper 32 releases the two-ply sheet PJ from the gripping. Note that, in the present embodiment, the cam 34 in the moving mechanism 30 moves to release the gripping of the gripper 32. However, when the pulling force by conveyance of the two-ply sheet PJ by the third conveyance roller pair 6 is greater than the gripping force of the gripper 32 to grip the two-ply sheet PJ, the gripping of the two-ply sheet PJ by the gripper 32 can be released by pulling the two-ply sheet PJ from the gripper 32 due to conveyance of the two-ply sheet PJ by the third conveyance roller pair 6 without moving the cam 34 in the moving mechanism 30.

Thereafter, as illustrated in FIG. 7B, the controller 500 causes the third conveyance roller pair 6 to rotate in the forward direction again to start conveyance of the two-ply sheet PJ in the forward direction, in step S14 of FIG. 13B. In addition, after the gripped portion B of the two-ply sheet PJ, i.e., the other end of the two-ply sheet PJ and the trailing end of the two-ply sheet PJ in the forward direction, passes over the branch portion between the third sheet conveyance passage K3 and each of the first branched sheet conveyance passage K4 and the second branched sheet conveyance passage K5, the gripper 32 moves from the releasing position to the gripping position. Further, at this time, the fourth sensor 44 detects the gripped portion B of the two-ply sheet PJ, i.e., the other end of the two-ply sheet PJ and the trailing end of the two-ply sheet PJ conveyed in the forward direction. Then, the controller 500 determines whether the third conveyance roller pair 6 conveys the two-ply sheet PJ by a predetermined amount X5 in response to the timing at which the fourth sensor 44 detects the trailing end of the two-ply sheet PJ conveyed in the forward direction, in other words, after the fourth sensor 44 has detected the gripped portion B of the two-ply sheet PJ, in step S15 of FIG. 13B. When the third conveyance roller pair 6 does not convey the two-ply sheet PJ by the predetermined amount X5 after the fourth sensor 44 has detected the gripped portion B of the two-ply sheet PJ (NO in step S15 of FIG. 13B), step S15 is repeated until the third conveyance roller pair 6 conveys the two-ply sheet PJ by the predetermined amount X5 after the fourth sensor 44 has detected the gripped portion B of the two-ply sheet PJ. By contrast, when the third conveyance roller pair 6 conveys the two-ply sheet PJ by the predetermined amount X5 after the fourth sensor 44 has detected the gripped portion B of the two-ply sheet PJ (YES in step S15 of FIG. 13B), as illustrated in FIG. 12D, the controller 500 causes the third conveyance roller pair 6 to stop conveying the two-ply sheet PJ and causes the separation claws 16 to move in the width direction of the two-ply sheet PJ, in step S28 of FIG. 13B. As a result, as illustrated in FIG. 7B, the trailing ends of the first sheet P1 and the second sheet P2 of the two-ply sheet PJ conveyed in the forward direction are separated and largely opened (see FIG. 12D). At this time, the controller 500 starts to perform the sheet separating operation (sheet separation) on the two-ply sheet PJ.

Then, as illustrated in FIG. 7C, the third conveyance roller pair 6 rotates in the reverse direction to start conveying the two-ply sheet PJ in the reverse direction, in step S16 of FIG. 13B. At this time, since the separation claws 16 are disposed at the switching positions at which the separation claws 16 block the two-ply sheet PJ moving to the third sheet conveyance passage K3 (i.e., the position illustrated in FIG. 12D), the first sheet P1 and the second sheet P2 separated from each other are guided to the first branched sheet conveyance passage K4 and the second branched sheet conveyance passage K5, respectively, as illustrated in FIG. 7C. At this time, the fifth sensor 45 (see FIG. 1) detects the bonding portion A of the two-ply sheet PJ, that is, the one end of the two-ply sheet PJ and the trailing end of the two-ply sheet PJ conveyed in the reverse direction. Subsequently, the controller 500 determines whether the fifth sensor 45 (see FIG. 1) that functions as a sheet detector has detected the trailing end of the two-ply sheet PJ conveyed in the reverse direction, that is, the bonding portion A, in step S17 of FIG. 13B. In response to detection of the trailing end of the two-ply sheet PJ in the reverse direction by the fifth sensor 45 (see FIG. 1), the controller 500 causes the second feed roller 3 to start feeding the inner sheet PM from the second feed tray 12, in step S18 of FIG. 13B.

Note that the timing at which the second feed roller 3 starts to feed the inner sheet PM is not limited to the above-described timing. It is preferable to set the timing to reduce the time to perform the sheet separating operation and the sheet inserting operation.

Subsequently, as illustrated in FIG. 8A, in response to the timing of detection of the trailing end of the two-ply sheet PJ in the reverse direction by the fifth sensor 45 (see FIG. 1), the controller 500 causes the third conveyance roller pair 6 to rotate to convey the two-ply sheet PJ by a predetermined amount X6 and stop the conveyance of the two-ply sheet PJ when the two-ply sheet PJ has been conveyed by the predetermined amount X6, in step S19 of FIG. 13B. When the third conveyance roller pair 6 conveys the two-ply sheet PJ by the predetermined amount X6, the bonding portion A of the two-ply sheet PJ is in the nip region of the third conveyance roller pair 6 or at a position slightly leftward from the nip region of the third conveyance roller pair 6. In other words, the one end of the two-ply sheet PJ is nipped by the third conveyance roller pair 6. With this state, the sheet separating operation of the two-ply sheet PJ is completed.

Further, before completion of the sheet separating operation of the two-ply sheet PJ, the controller 500 has already started feeding the inner sheet PM from the second feed tray 12. Since the inner sheet PM is fed from the second feed tray 12, as illustrated in FIG. 8A, when the sheet separating operation on the two-ply sheet PJ is completed, the leading end of the inner sheet PM (i.e., at one end of the inner sheet PM in the forward direction) has approached the position at which the inner sheet PM is inserted between the first sheet P1 and the second sheet P2 of the two-ply sheet PJ.

On the other hand, the third sensor 43 detects the leading end of the inner sheet PM (i.e., at one end of the inner sheet PM in the forward direction). In addition, as illustrated in FIG. 8B, in response to the detection of the leading end of the inner sheet PM, the separation claws 16 move to the respective standby positions at the timing at which the separation claws 16 do not block conveyance of the inner sheet PM.

Figure 12E:
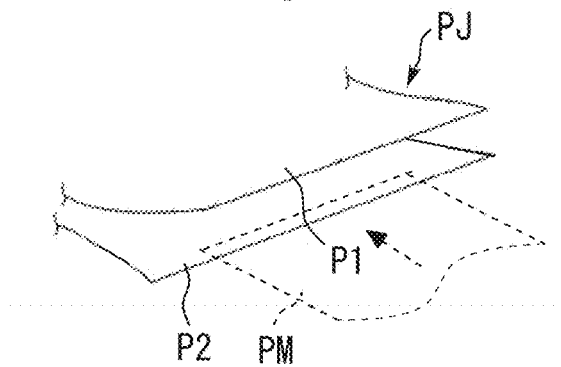

Further, as illustrated in FIGS. 8C and 12E, the controller 500 determines whether the third sensor 43 has detected the leading end of the inner sheet PM in the forward direction, in step S20 of FIG. 13B. When the third sensor 43 has not detected the leading end of the inner sheet PM in the forward direction (NO in step S20 of FIG. 13B), step S20 is repeated until the third sensor 43 detects the leading end of the inner sheet PM in the forward direction. By contrast, when the third sensor 43 has detected the leading end of the inner sheet PM in the forward direction (YES in step S20 of FIG. 13B), in response to the detection of the leading end of the inner sheet PM, the controller 500 causes the second conveyance roller pair to convey the inner sheet PM by a predetermined amount X7. Then, the controller 500 causes the third conveyance roller pair 6 to start conveying the two-ply sheet PJ in the forward direction again, in step S21 of FIG. 13B. At this time, the inner sheet PM is accurately nipped at a desired position between the first sheet P1 and the second sheet P2 of the two-ply sheet PJ.

Thus, the controller 500 finishes the sheet inserting operation to insert the inner sheet PM in the two-ply sheet PJ, in other words, between the first sheet P1 and the second sheet P2 of the two-ply sheet PJ (step S22 of FIG. 13B).

At this time, as illustrated in FIG. 9A, the switching claw 17 (see FIG. 1) opens the fourth sheet conveyance passage K6 (in step S23 of FIG. 13B). Thereafter, the controller 500 causes the third conveyance roller pair 6 to convey the two-ply sheet PJ to which the inner sheet PM has been inserted after the sheet separating operation, so that the two-ply sheet PJ passes through the fourth sheet conveyance passage K6 to be conveyed to the sheet lamination device 51.

Then, as illustrated in FIG. 9B, the sheet lamination device 51 starts to perform the sheet laminating operation on the two-ply sheet PJ (i.e., the preceding two-ply sheet PJ1) (in step S31 of FIG. 14). In other words, while the two-ply sheet PJ (i.e., the preceding two-ply sheet PJ1) is conveyed in the sheet lamination device 51, the entire area of the two-ply sheet PJ is gradually bonded with the inner sheet PM being inserted in the two-ply sheet PJ. At this time, the subsequent two-ply sheet PJ2 (before separation) is conveyed from the first feed tray 11 to the sheet separation device 1 without interfering the preceding two-ply sheet PJ1.

Then, as illustrated in FIG. 9C, after the fifth sensor 45 detects the trailing end of the preceding two-ply sheet PJ1 (that is the trailing end of the preceding two-ply sheet PJ1 conveyed in the forward direction, in other words, the other end of the preceding two-ply sheet PJ1), the controller 500 determines whether the preceding two-ply sheet PJ1 is conveyed by a predetermined amount X8 (in step S32 of FIG. 14). When the preceding two-ply sheet PJ1 is not conveyed by the predetermined amount X8 (NO in step S32 of FIG. 14), step S32 is repeated until the preceding two-ply sheet PJ1 is conveyed by the predetermined amount X8. By contrast, when the preceding two-ply sheet PJ1 is conveyed by the predetermined amount X8 (YES in step S32 of FIG. 14), in response to this detection of conveyance of the preceding two-ply sheet PJ1, the sheet separating operation is started on the two-ply sheet PJ2 (step S33 of FIG. 14). This timing indicates when the trailing end of the preceding two-ply sheet PJ1 passes the branching point of the fourth sheet conveyance passage K6 and the retract sheet conveyance passage K7.

At this time, as illustrated in FIG. 9C, the switching claw 17 closes the fourth sheet conveyance passage K6 and the opens the retract sheet conveyance passage K7. Then, the third conveyance roller pair 6 and the second ejection roller pair 8, each rotating in arrow in FIG. 9C, guide the subsequent two-ply sheet PJ2 into the retract sheet conveyance passage K7 to convey the subsequent two-ply sheet PJ2 to the second ejection tray 55 (retract portion). At this time, the trailing end of the subsequent two-ply sheet PJ2 (gripped portion B) may not be located upstream from the winding start position W of the winding roller 20 (see FIG. 5B). A part of the subsequent two-ply sheet PJ2, which is protruded upstream from the third conveyance roller pair 6 in the sheet conveyance direction, is temporarily purged into the retract sheet conveyance passage K7.

Then, as illustrated in FIG. 9C, the controller 500 causes each of the winding roller 20, the third conveyance roller pair 6, and the second ejection roller pair 8 to rotate in the direction indicated by arrow in FIG. 9C, so that the subsequent two-ply sheet PJ2 is wound around the winding roller 20.

Further, as illustrated in FIG. 10A, the controller 500 starts to peel (separate) the first sheet P1 and the second sheet P2 of the subsequent two-ply sheet PJ2 and to feed the inner sheet PM from the second feed tray 12. The inner sheet PM is to be inserted into the subsequent two-ply sheet PJ2. The series of the sheet separating operation and the sheet inserting operation performed on the subsequent two-ply sheet PJ2 is same as the series of the sheet separating operation and the sheet inserting operation performed on the preceding two-ply sheet PJ1, which has been described with reference to FIGS. 4A to 8C.

Then, as illustrated in FIG. 10B, the controller 500 determines whether the trailing end of the preceding two-ply sheet PJ1 has passed through the nip region (the extreme upstream portion) of the first heat-pressure roller pair 51a (in step S34 of FIG. 14). When the trailing end of the preceding two-ply sheet PJ1 has not passed through the nip region (the extreme upstream portion) of the first heat-pressure roller pair 51a (NO in step S34), step S34 is repeated until the trailing end of the preceding two-ply sheet PJ1 passes through the nip region of the first heat-pressure roller pair 51a. On the other hand, when the trailing end of the preceding two-ply sheet PJ1 has passed through the nip region of the first heat-pressure roller pair 51a (YES in step S34), in response to the timing at which the trailing end of the preceding two-ply sheet PJ1 passes through the nip region of the first heat-pressure roller pair 51a, the subsequent two-ply sheet PJ2 in which the inner sheet PM being inserted is conveyed toward the sheet lamination device 51 (in step S35 of FIG. 14). At this time, the switching claw 17 is rotated to the position to open the fourth sheet conveyance passage K6 and close the retract sheet conveyance passage K7. Note that, in the present embodiment, the timing at which the trailing end of the preceding two-ply sheet PJ1 passes through the nip region of the first heat-pressure roller pair 51a is determined based on the timing of detection of the trailing end of the preceding two-ply sheet PJ1 by the fifth sensor 45. However, the timing at which the trailing end of the preceding two-ply sheet PJ1 passes through the nip region of the first heat-pressure roller pair 51a may be determined based on the rotation time of the first heat-pressure roller pair 51a. Alternatively, a sheet detection sensor may be disposed proximate to the first heat-pressure roller pair 51a to directly detect the trailing end of the preceding two-ply sheet PJ1.

Then, as illustrated in FIG. 10C, the controller 500 causes the sheet lamination device 51 to start to perform the sheet laminating operation on the subsequent two-ply sheet PJ2 (step S36 in FIG. 14). Further, after the sheet laminating operation is performed on the preceding two-ply sheet PJ1, the preceding two-ply sheet PJ1 is ejected to the outside of the image forming apparatus 100 by the first ejection roller pair 7 and is stacked on the first ejection tray 13.

Thereafter, the controller 500 determines whether there is no subsequent two-ply sheet following the subsequent two-ply sheet PJ2 (another subsequent two-ply sheet) (in step S37 of FIG. 14). When there is another two-ply sheet following the subsequent two-ply sheet PJ2 (NO in step S37), step goes back to step S32 and steps S32 to S37 are repeated until no more two-ply sheet is detected.

By contrast, when there is no two-ply sheet following the subsequent two-ply sheet PJ2 (YES in step S37), the controller 500 determines whether the sheet laminating operation on the subsequent two-ply sheet PJ2 is finished (in step S38 of FIG. 14). When the sheet laminating operation on the subsequent two-ply sheet PJ2 is not finished (NO in step S38), step S38 is repeated until it is determined that the sheet laminating operation on the subsequent two-ply sheet PJ2 is finished. On the other hand, when the sheet laminating operation on the subsequent two-ply sheet PJ2 is finished (YES in step S38), the subsequent two-ply sheet PJ2 is ejected and stacked on the first ejection tray 13, and the flow in FIG. 14 ends.

As described above, the sheet laminator 50 according to the present embodiment performs the sheet laminating operation as a sequence of the following operations: an operation to feed the two-ply sheet PJ; an operation to separate the first sheet P1 and the second sheet P2 of the two-ply sheet PJ; an operation to insert the inner sheet PM into the space between the first sheet P1 and the second sheet P2; and an operation to perform the sheet laminating operation on the two-ply sheet PJ in which the inner sheet PM is inserted. The sequence of these operations can enhance the user convenience for the sheet laminator 50. As described above, the sheet laminator 50 continuously performs these operations on a plurality of two-ply sheets PJ including the preceding two-ply sheet PJ1 and the subsequent two-ply sheet PJ2. In the continuous operations, while the sheet laminating operation is performed on the preceding two-ply sheet PJ1, the sheet separating operation is performed on the subsequent two-ply sheet PJ2. Accordingly, the productivity of the sheet laminator 50 and the image forming apparatus 100 is enhanced.

The sheet laminator 50 according to the present embodiment can select one of a "first mode" for focusing on the productivity of the sheet laminator 50 and a "second mode" for focusing on the power saving of the sheet laminator 50.

The "first mode" is a control mode in which the heater 52 (heater) constantly heats the sheet lamination device 51 (the heat-pressure roller pairs 51a, 51b, and 51c) when the power source is turned on, in other words, when the main power source of the image forming apparatus 100 is turned on.

Specifically, when a user operates the operation display panel 49 (see FIG. 1) and selects the "first mode" through the operation display panel 49, the heater 52 (heater) is constantly turned on unless the power source is basically turned off, in other words, unless the main power source of the image forming apparatus 100 is turned off). In other words, when the power source is turned on, the heater 52 is turned on, and when the power source is turned off, the heater 52 is turned off.

As a result, when the "first mode" is selected, the heater 52 is constantly turned on and the power consumption of the image forming apparatus 100 increases. However, the start-up operation to heat the heat-pressure roller pairs 51a, 51b, and 51c by the heater 52 to increase to the desired temperature is not performed for each sheet laminating operation, and the productivity of the sheet laminator 50 is enhanced. In other words, the time for the operation from the request (instruction) of the sheet laminating operation to the end of the sheet laminating operation is reduced.

As a result, selecting the "first mode" is easy to use and satisfactory for the user who focuses on the productivity even if the power consumption is relatively high.

On the other hand, the "second mode" is a control mode in which the heater 52 (heater) starts heating the sheet lamination device 51 (the heat-pressure roller pairs 51a, 51b, and 51c) in response to the request of the sheet laminating operation and stops heating the sheet lamination device 51 after a given time Tx has elapsed from completion of the sheet laminating operation.

Specifically, when the user operates the operation display panel 49 (see FIG. 1) and selects the "second mode" through the operation display panel 49, the heater 52 (heater) is not turned on unless the user basically presses the operation button on the operation display panel 49 to prompt the sheet laminating operation. In other words, when the sheet laminating operation is requested, the heater 52 is turned on, and when the sheet laminating operation is completed, the heater 52 is turned off after the given time Tx has elapsed.

As a result, when the "second mode" is selected, the start-up operation to heat the heat-pressure roller pairs 51a, 51b, and 51c by the heater 52 to increase to the desired temperature needs to be performed for each sheet laminating operation. This operation decreases the productivity of the sheet laminator 50. However, since the heater 52 is turned on only when the sheet laminating operation is performed, the power consumption of the sheet laminator 50 is decreased.

As a result, selecting the "second mode" is easy to use and satisfactory for the user who focuses on the lower power consumption even if the productivity of the sheet laminator 50 decreases.

As described above, since the "second mode" is a control mode for reducing the power consumption of the sheet laminator 50, the "second mode" is appropriately referred to as a "power saving mode".

Figure 16A:
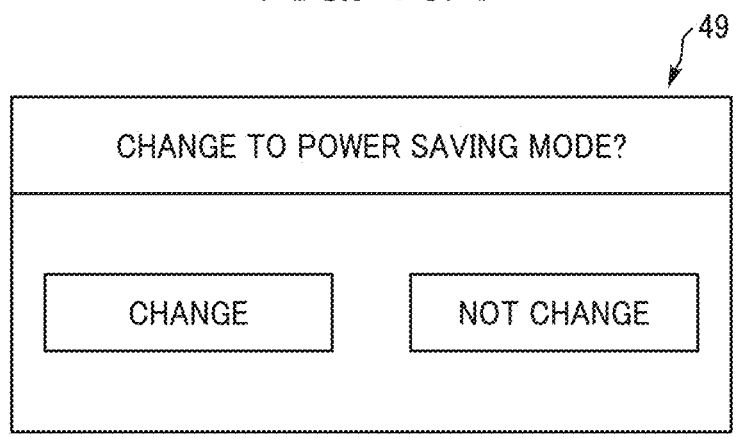
FIGS. 16A and 16B are diagrams, each illustrating a display on an operation display panel related to a power saving mode.
Figure 16B:
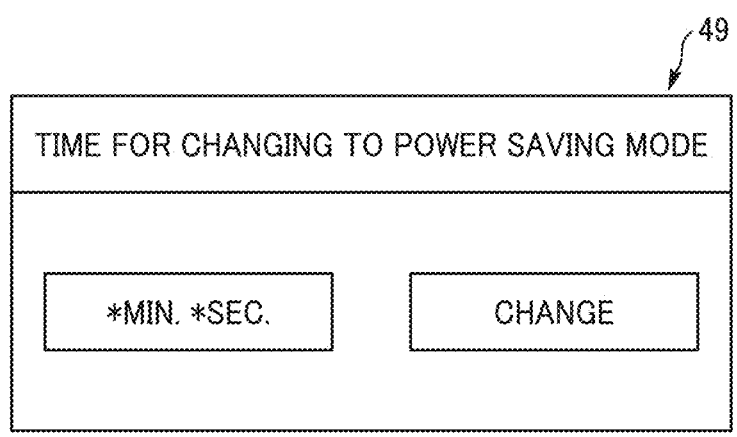

Now, FIGS. 16A and 16B are diagrams, each illustrating a display on the operation display panel 49 related to the power saving mode.

In the present embodiment, the sheet laminator 50 can select one of the "first mode" and the "second mode" by the operation via the operation display panel 49 (see FIG. 16A) by the user.

Specifically, referring to FIG. 16A, when the user opens the selection window of the operation display panel 49 and presses "CHANGE" on the selection window, the first mode is selected. On the other hand, when the user presses "NOT CHANGE" on the selection window, the second mode is selected.

In the present embodiment, the controller 500 can adjust the given time Tx in the "second mode", in other words, a time to turn on the heater 52 after completion of the sheet laminating operation.

Specifically, referring to FIG. 16B, when the user opens the selection window of the operation display panel 49 and changes the given time Tx displayed as "* MIN. * SEC.", the "CHANGE" button is pressed to adjust the given time Tx ("* MIN. * SEC."). The timing at which the sheet laminating operation ends may be set to a timing at which the trailing end of two-ply sheets PJ (object) by an ejection sensor disposed near the first ejection roller pair 7. In the present embodiment, in the window display of the operation display panel 49, the changing state from the turning on of the heater 52 to the turning off of the heater 52 after the sheet laminating operation is performed in the "second mode" is described as "TIME FOR CHANGING TO POWER SAVING MODE".

Such an adjustment of the given time Tx fulfills detailed requests of the user and enhances the usability. For example, when a series of sheet laminating operations are performed at a certain interval (time), the given time Tx may be adjusted to be longer to some extent. By so doing, the power consumption is lowered and a decrease in the productivity can be prevented.

As described above, in the present embodiment, the controller 500 can select one of the "first mode" focusing on the productivity of the sheet laminator 50 and the "second mode" focusing on the power saving of the sheet laminator 50 and adjust the time from when the sheet laminating operation is completed to when the heater 52 is turned on in the "second mode" (given time Tx).

For this reason, the sheet laminator can be easy to use and be satisfactory for a user who focuses on the productivity even if the power consumption increases and for a user who focuses on a reduction of the power consumption even if the productivity decreases.

Figure 17:
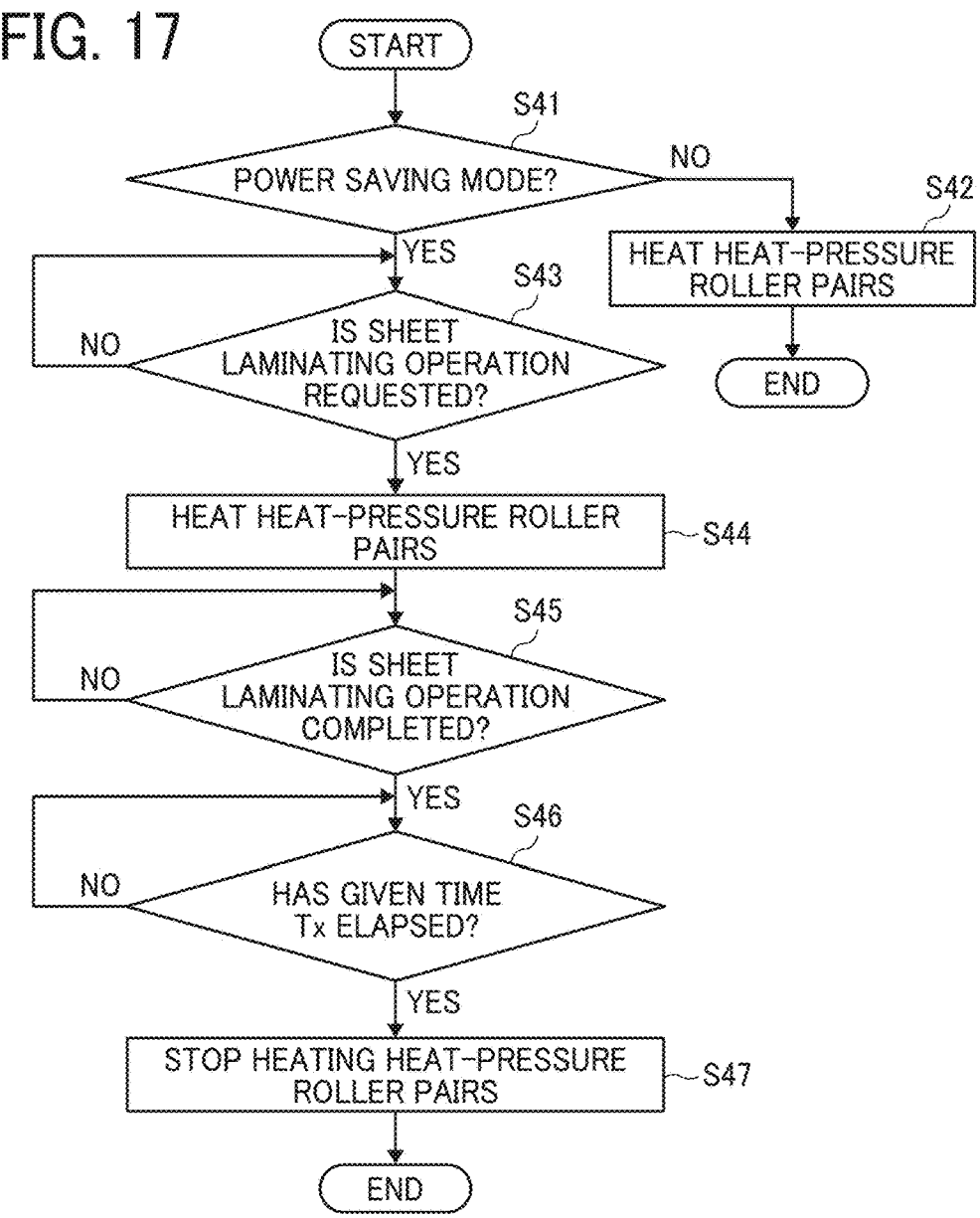
FIG. 17 is a flowchart of control related to the power saving mode.

A description is given of a control flow related to the power saving mode, with reference to FIG. 17.

FIG. 17 is a flowchart of control related to the power saving mode.

As illustrated in the flowchart of FIG. 17, the controller 500 determines whether the second mode (power saving mode) is selected when the power source is turned on (step S41).

As a result, when it is determined that the second mode (power saving mode) is not selected (NO in step S41), it is determined that the first mode is selected. Accordingly, the controller 500 turns on the heater 52 to heat the heat-pressure roller pairs 51a, 51b, and 51c of the sheet lamination device 51 (step S42), and then ends the flow of the flowchart of the flowchart of FIG. 17.

By contrast, when it is determined that the second mode (power saving mode) is selected (YES in step S41), the controller 500 determines whether the sheet laminating operation is requested (step S43). When the sheet laminating operation is not requested (NO in step S43), step S43 is repeated until the sheet laminating operation is requested. On the other hand, when the sheet laminating operation is requested (YES in step S43), the controller 500 turns on the heater 52 to heat the heat-pressure roller pairs 51a, 51b, and 51c (of the sheet lamination device 51) (step S44). Then, the controller 500 determines whether the sheet laminating operation is completed (step S45). When the sheet laminating operation is not completed (NO in step S45), step S45 is repeated until the sheet laminating operation completes. By contrast, when the sheet laminating operation is completed (YES in step S45), the controller 500 determines whether the given time Tx that is the time set through the setting screen illustrated in FIG. 16B has elapsed (step S46). When the given time Tx has not elapsed (NO in step S46), step S46 is repeated until the given time Tx elapses. On the other hand, when the given time Tx has elapsed (YES in step S46), the controller 500 turns off the heater 52 to stop heating the heat-pressure roller pairs 51a, 51b, and 51c (of the sheet lamination device 51) (step S47), and then ends the flow of the flowchart of FIG. 17.

Modification 1

In Modification 1, when the "second mode" is canceled, the sheet laminator 50 can select whether to immediately change to the "first mode" or to change to the "first mode" in response to the request for the sheet laminating operation.

The cancelation of the second mode (power saving mode) changes from the second mode to the first mode.

Figure 18:
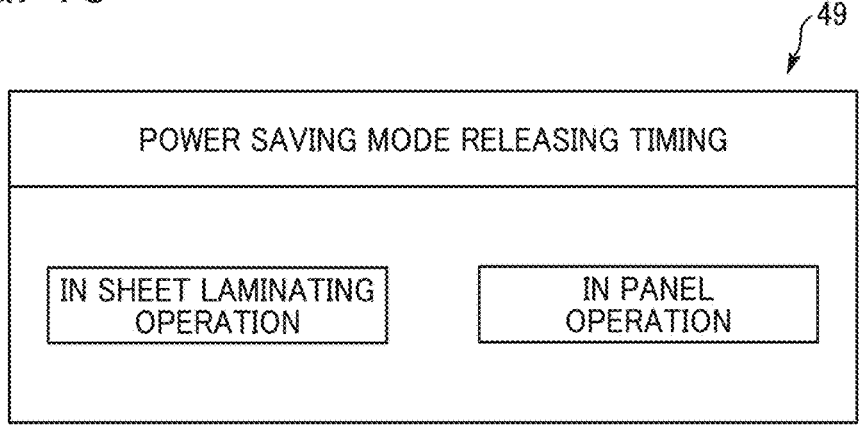
FIG. 18 is a diagram illustrating the display window of the operation display panel related to the power saving mode, according to Modification 1.

FIG. 18 is a diagram illustrating the display window of the operation display panel related to the power saving mode, according to Modification 1.

Specifically, referring to FIG. 18, when the user opens the setting screen related to the power saving mode cancelation timing of the operation display panel 49 and presses "IN SHEET LAMINATING OPERATION", the mode is changed from the "second mode" to the "first mode" after the sheet laminating operation is requested. When the user presses "IN PANEL OPERATION", the mode is immediately changed from the "second mode" to the "first mode".

As described above, the timing of canceling the power saving mode can be adjusted in this manner, so that the sheet laminator 50 can fulfill the detailed requests of the user and enhance the usability. For example, when it is desired to immediately perform the sheet laminating operation with the productivity temporarily increased, the mode can be immediately changed to the "first mode" after cancelation of the second mode. When it is desired to start the sheet laminating operation with the increased productivity, the mode can be immediately changed to the "first mode" in response to the request of the sheet laminating operation after the cancelation of the second mode.

Figure 19:
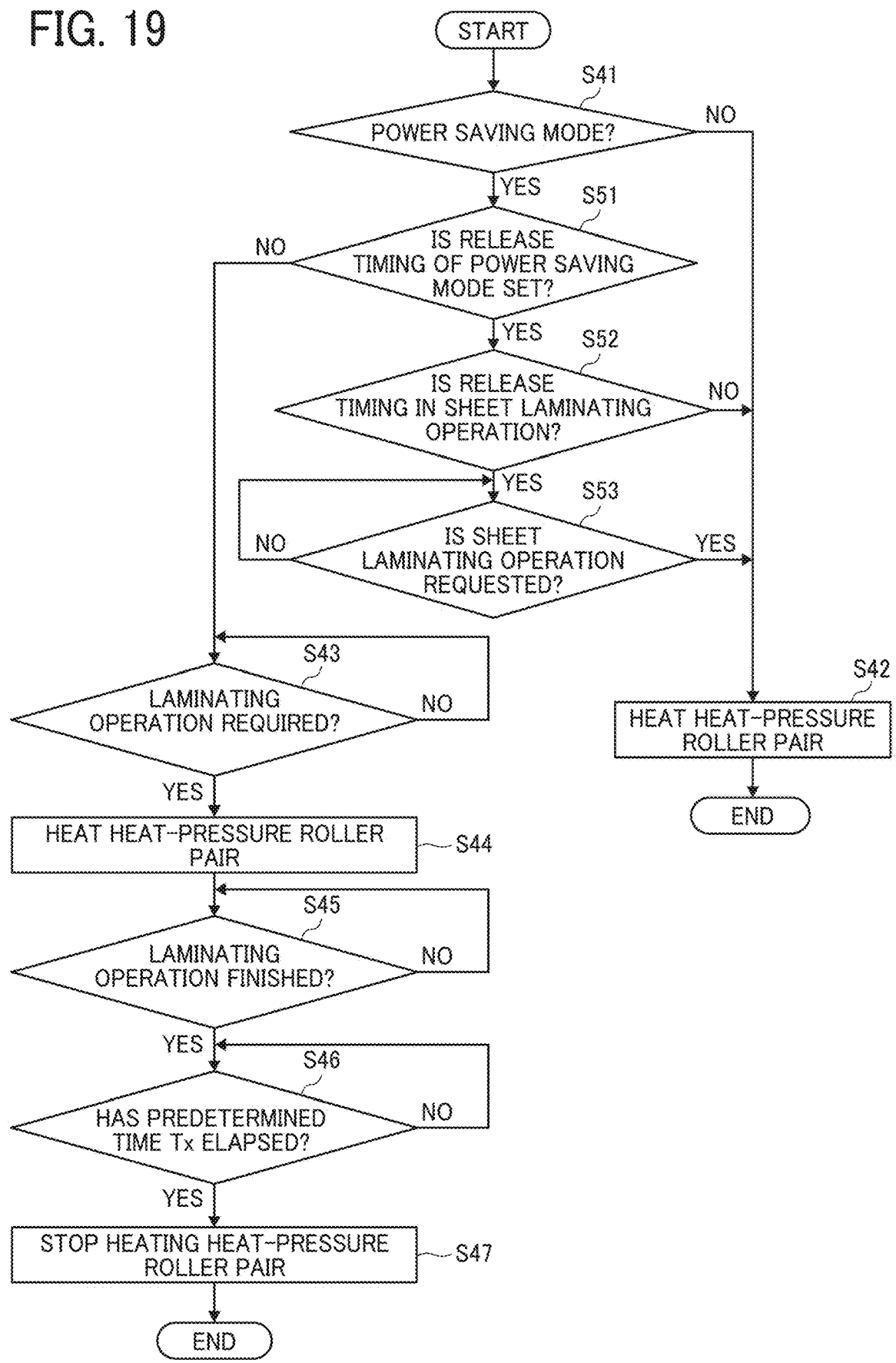
FIG. 19 is a flowchart of control related to the power saving mode of the operation display panel of FIG. 18.

A description is given of a control flow related to the power saving mode, with reference to FIG. 19.

FIG. 19 is a flowchart of control related to the power saving mode according to Modification 1 of the present embodiment.

As illustrated in the flowchart of FIG. 19, the controller 500 determines whether the second mode (power saving mode) is selected when the power source is turned on (step S41).

As a result, when it is determined that the second mode (power saving mode) is not selected (NO in step S41), it is determined that the first mode is selected. Accordingly, the controller 500 turns on the heater 52 to heat the heat-pressure roller pairs 51a, 51b, and 51c of the sheet lamination device 51 (step S42), and then ends the flow of the flowchart of the flowchart of FIG. 19.

On the other hand, when it is determined that the second mode (power saving mode) is selected (YES in step S41), the controller 500 determines whether the release timing to cancel the second mode (power saving mode) is set (step S51). As a result, when the release timing of the second mode (power saving mode) is not set (NO in step S51), the procedure skips to step S43. For details, refer to the description related to the flowchart of FIG. 17.

By contrast, when the release timing of the second mode (power saving mode) is set (YES in step S51), the controller 500 determines whether the release timing is in the sheet laminating operation (step S52). As a result, when the release timing is not in the "sheet laminating operation" (NO in step S52), step S42 is immediately performed, in other words, the heat-pressure roller pairs 51a, 51b, and 51c are heated to immediately change to the "first mode". When the release timing is in the "sheet laminating operation" (YES in step S52), the controller 500 determines whether the sheet laminating operation is requested (step S53). When the sheet laminating operation is not requested (NO in step S53), step S53 is repeated until the sheet laminating operation is requested. When the sheet laminating operation is requested (YES in step S53), the heat-pressure roller pairs 51a, 51b, and 51c are heated to change to the "first mode".

Modification 2

Figure 20:
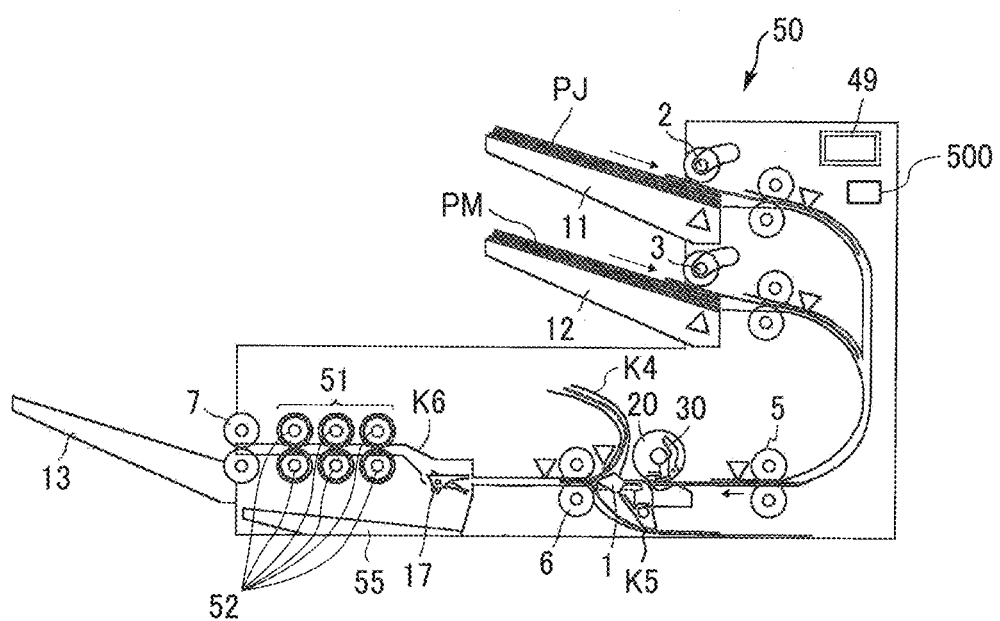
FIG. 20 is a schematic view of a sheet laminator, according to Modification 2 of an embodiment of the present disclosure.

Next, a description is given of the sheet laminator according to Modification 2 of the present embodiment, with reference to FIG. 20.

FIG. 20 is a schematic view of the sheet laminator 50, according to Modification 2 of the present embodiment.

As illustrated in FIG. 20, the first feed tray 11 on which the two-ply sheets PJ are loaded and the second feed tray 12 on which the inner sheets PM are loaded are aligned in the vertical direction.

The first branched sheet conveyance passage K4 and the second branched sheet conveyance passage K5 are formed in a substantially S-shape so as to expand from the branching point in different directions, in other words, in a left-side direction and a right-side direction, in FIG. 20.

Like the sheet laminator 50 according to Modification 1, the sheet laminator 50 according to Modification 2 can select one of the "first mode" for focusing on the productivity of the sheet laminator 50 and the "second mode" for focusing on the power saving of the sheet laminator 50 and adjust the time from when the sheet laminating operation is completed to when the heater 52 is turned on in the "second mode" (given time Tx).

For this reason, the sheet laminator can be easy to use and be satisfactory for the user who focuses on the productivity even if the power consumption increases and for the user who focuses on a reduction of the power consumption even if the productivity decreases.

Modification 3

Figure 21:
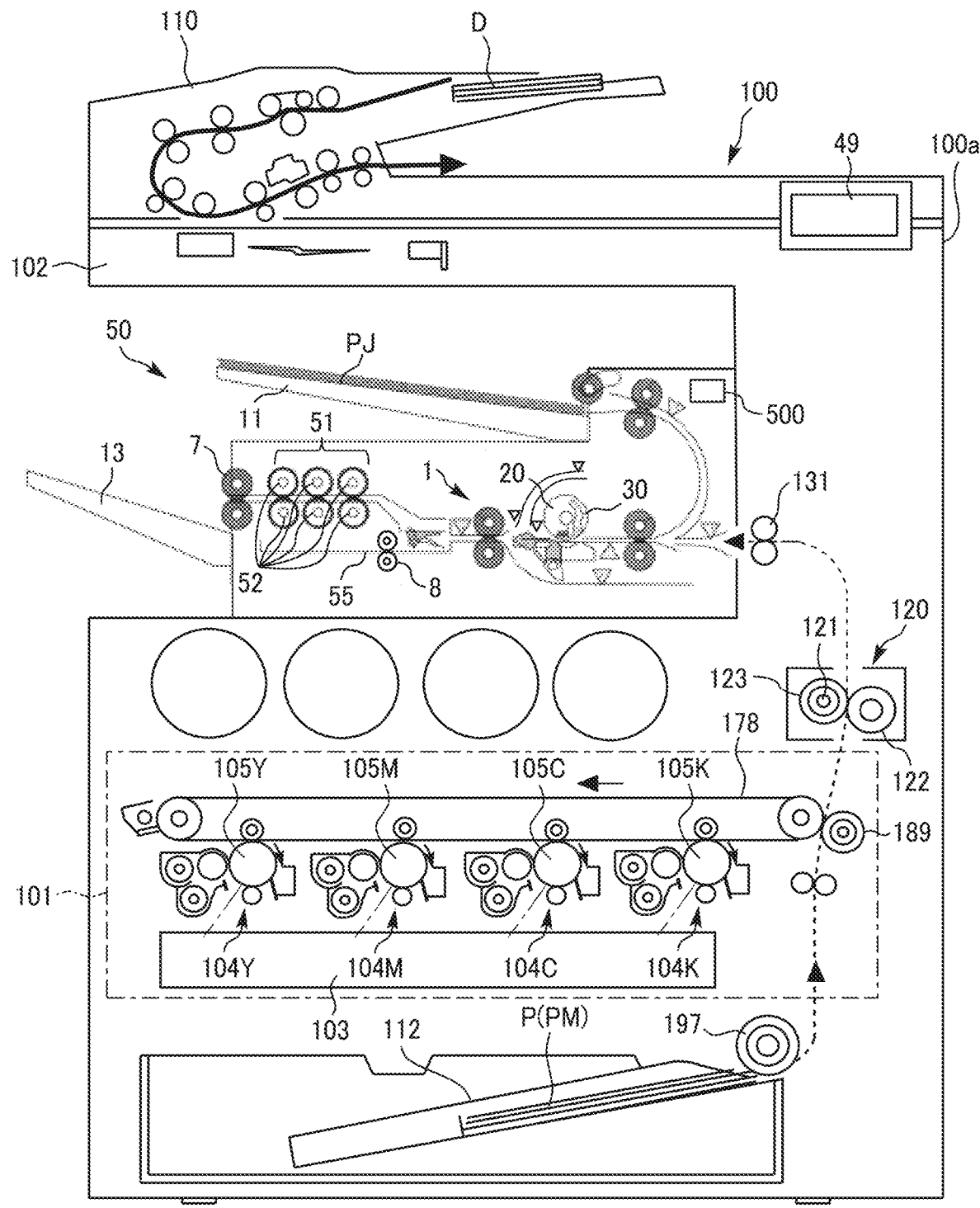
FIG. 21 is a schematic view of an image forming apparatus, according to Modification 3 of an embodiment of the present disclosure.

A description is given of an image forming apparatus according to Modification 3, with reference to FIG. 21.

FIG. 21 is a schematic view of the image forming apparatus 100, according to Modification 3 of the present embodiment.

As illustrated in FIG. 21, the image forming apparatus 100 according to Modification 3 that forms an image on a sheet P includes the sheet laminator 50 illustrated in FIG. 1, on a housing 100a of the image forming apparatus 100. The housing 100a holds an image forming device 101 that performs an image forming operation in the image forming apparatus 100 to form an image on a sheet such as the inner sheet PM. However, in the image forming apparatus 100, the sheet P that is fed from a sheet feeding device 112 disposed in the housing 100a and conveyed by a sheet feed roller 197 disposed in the housing 100a is conveyed as the inner sheet PM to the sheet laminator 50.

With reference to FIG. 21, in the image forming apparatus 100, multiple pairs of sheet conveying rollers disposed in a document feeder 110 feed an original document D from a document loading table and convey the original document D in a direction indicated by arrow in FIG. 21. By so doing, the original document D passes over a document reading device 102. At this time, the document reading device 102 optically reads image data of the original document D passing over the document reading device 102.

The image data optically read by the document reading device 102 is converted into electrical signals and transmitted to a writing device 103. The writing device 103 emits laser beams onto photoconductor drums 105Y, 105M, 105C, and 105K, based on the electrical signals of the image data in each of colors, respectively. By so doing, an exposure process is executed by the writing device 103.

On the photoconductor drums 105Y, 105M, 105C, and 105K of respective image forming units 104Y, 104M, 104C, and 104K, a charging process, the exposure process, and a developing process are executed to form desired images on the photoconductor drums 105Y, 105M, 105C, and 105K, respectively.

The images formed on the photoconductor drums 105Y, 105M, 105C, and 105K are transferred and superimposed onto an intermediate transfer belt 178 to form a color image. The color image formed on the intermediate transfer belt 178 is transferred onto the surface of a sheet P (which is a sheet to function as the inner sheet PM) fed and conveyed by the sheet feed roller 197 from the sheet feeding device 112 that functions as a second sheet feeder, at a position at which the intermediate transfer belt 178 faces a secondary transfer roller 189.

After the color image is transferred onto the surface of the sheet P (that is, the inner sheet PM), the sheet P is conveyed to the position of a fixing device 120. The fixing device 120 fixes the transferred color image on the surface of the sheet P, to the sheet P by performing the fixing operation in the fixing process. The fixing device 120 includes a fixing roller 121 and a pressure roller 122. The fixing roller 121 includes a fixing heater 123 serving as a heater. The pressure roller 122 contacts the fixing roller 121 with pressure to form a fixing nip region to which the sheet P is conveyed.

Thereafter, the sheet P is ejected from the housing 100a of the image forming apparatus 100 by an ejection roller pair 131, and is fed as the inner sheet PM, into the sheet laminator 50. At this time, when the sheet laminator 50 receives the inner sheet PM, the sheet laminator 50 has completed the operation described with reference to FIGS. 4A to 7C, in other words, the operation to separate the two-ply sheet PJ, and performs the operation described with reference to FIGS. 8A to 8C, in other words, the operation to insert the inner sheet PM into the two-ply sheet PJ, after the sheet laminator 50 receives the inner sheet PM. Further, after the sheet lamination device 51 has completed the sheet laminating operation on the two-ply sheet PJ (object) in which the inner sheet PM is inserted, the first ejection roller pair 7 ejects the two-ply sheet PJ to the outside of the sheet lamination device 51 to stack the two-ply sheet PJ on the first ejection tray 13.

As described above, a series of image forming operations (i.e., the printing operations) in the image forming apparatus 100 and a series of sheet separating operation of the two-ply sheet PJ and the sheet laminating operation of the inner sheet PM on which the image is formed are completed.

Like the sheet laminator 50 according to Modifications 1 and 5, the image forming apparatus 100 according to Modification 3 including the sheet laminator 50 can select one of the "first mode" for focusing on the productivity of the image forming apparatus 100 and the "second mode" for focusing on the power saving of the image forming apparatus 100 and adjust the time from when the sheet laminating operation is completed to when the heater 52 is turned on in the "second mode" (given time Tx).

For this reason, the sheet laminator can be easy to use and be satisfactory for the user who focuses on the productivity even if the power consumption increases and for the user who focuses on a reduction of the power consumption even if the productivity decreases.

The image forming apparatus 100 according to Modification 3 of the present disclosure is a color image forming apparatus but may be a monochrome image forming apparatus. The image forming apparatus 100 according to Modification 3 of the present disclosure employs electrophotography, but the present disclosure is not limited to this configuration. The present disclosure may be applied to other types of image forming apparatuses such as an inkjet image forming apparatus and a stencil printing machine.

The image forming apparatus 100 according to Modification 3 can execute the power saving mode (energy saving mode) to save electric power to be consumed by the devices and components in the housing 100a of the image forming apparatus 100.

Specifically, the power saving mode (energy saving mode) of the image forming apparatus 100 is a control mode in which the electric power that is supplied to the fixing heater 123 of the fixing device 120 is reduced than the electric power that is supplied for the regular printing operation, for example, when the printing operation in the image forming apparatus 100 is not performed for a given time (that can be changed and set by a user). As described above, the fixing device 120 performs the fixing process (fixing processing) by applying heat and pressure to the sheet P on which an unfixed image is borne, and the heater 123 functions as a fixing heater that heats the fixing roller 121 of the fixing device 120. Since the electric power consumed by the fixing device 120 accounts for a very large proportion of the electric power consumed by the entire image forming apparatus 100, executing the power saving mode (energy saving mode) can save more power (energy).

In Modification 3, when the power saving mode (energy saving mode) is executed in the housing 100a of the image forming apparatus 100, the electric power to the sheet laminator 50 is controlled not to be supplied.

Figure 22:
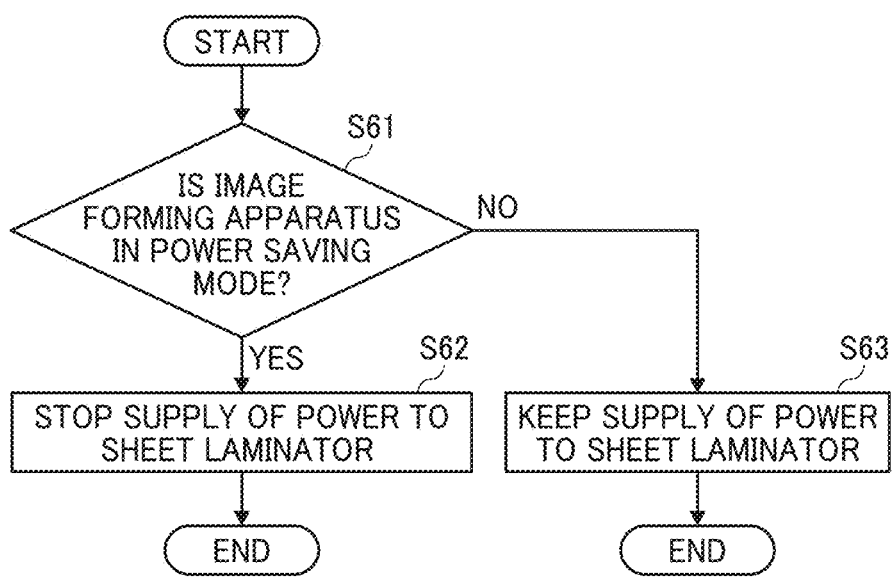
FIG. 22 is a flowchart of a control process executed in the image forming apparatus of FIG. 21.

Specifically, FIG. 22 is a flowchart of the control process executed in the image forming apparatus 100 of FIG. 21.

As illustrated in FIG. 22, the controller 500 determines whether the power saving mode (energy saving mode) of the image forming apparatus 100 is executed while the main power source of the housing 100a of the image forming apparatus 100 is turned on (step S61). In other words, the controller 500 determined whether the image forming apparatus 100 is in the power saving mode. As a result, when the power saving mode of the image forming apparatus 100 is executed (YES in step S61), the controller 500 turns off (stops) the supply of electric power to the sheet laminator 50 (step S62). When the power saving mode of the image forming apparatus 100 is not executed (NO in step S61), the controller 500 continues (keeps) the supply of electric power to the sheet laminator 50 (step S63).

Since the electric power consumed by the sheet laminator 50 (heater 52) is not small, the controller 500 turns off the power source of the sheet laminator 50 (heater 52) when the power saving mode (energy saving mode) of the image forming apparatus 100 is executed. By so doing, the electric power to be consumed by the entire image forming apparatus 100 can be efficiently reduced.

The image forming apparatus 100 according to Modification 3 starts heating the sheet lamination device 51 (i.e., the heat-pressure roller pairs 51a, 51b, and 51c) by the heater 52 after the fixing heater 123 has started to heat the fixing device 120 (i.e., the fixing roller 121).

Figure 23:
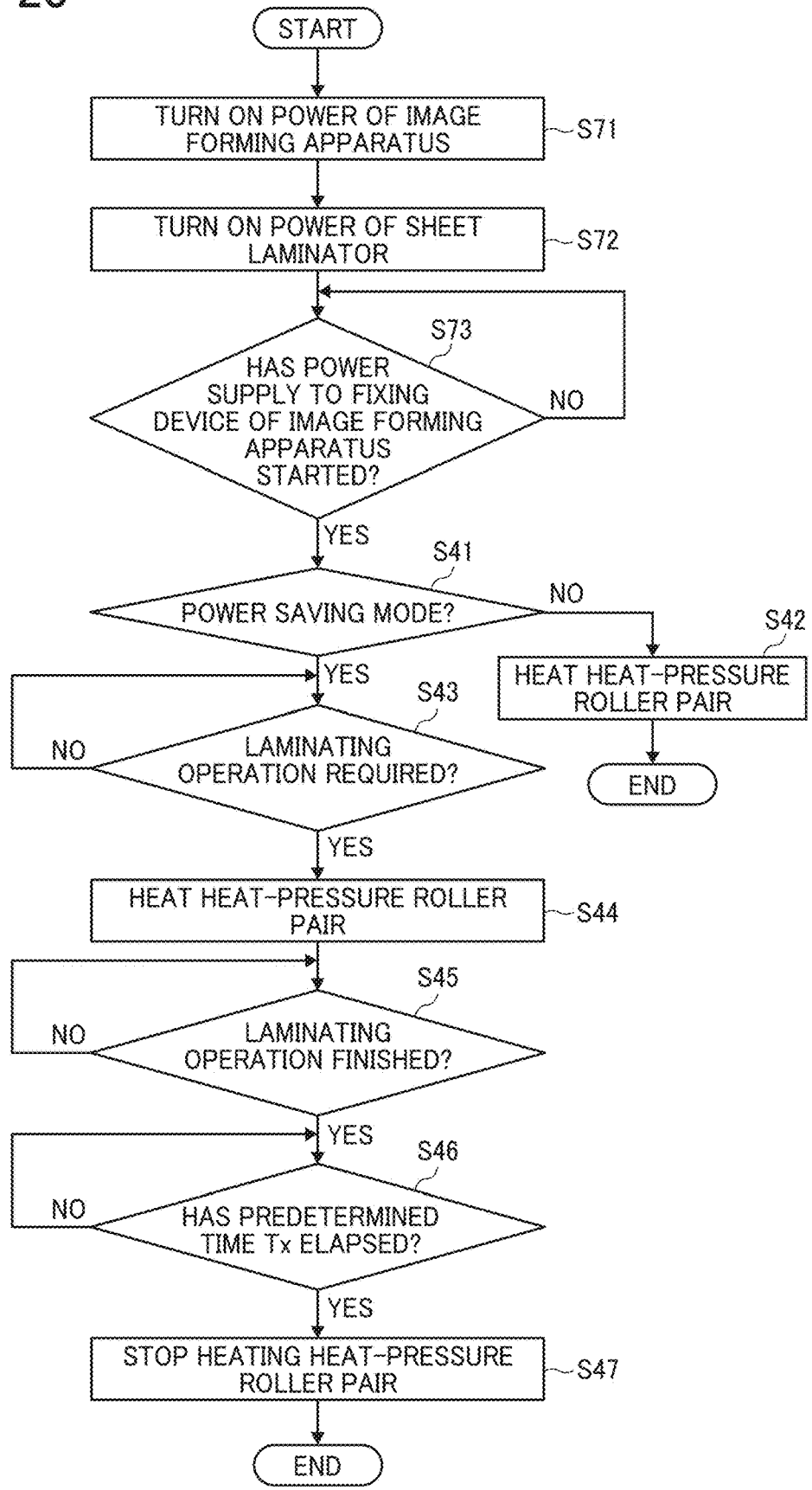
FIG. 23 is a flowchart of another control process executed in the image forming apparatus of FIG. 21.

To be more specific, FIG. 23 is a flowchart of another control process executed in the image forming apparatus 100 of FIG. 21.

As illustrated in FIG. 23, when the main power source of the image forming apparatus 100 is turned on (step S71), the main power source of the sheet laminator 50 is also turned on (step S72). Then, the controller 500 determines whether heating of the fixing device 120 of the image forming apparatus 100, in other words, the power supply to the fixing heater 123) has started (step S73). When the power supply to the fixing heater 123 has not started (NO in step S73), step S73 is repeated until the power supply to the fixing heater 123 starts. When the power supply to the fixing heater 123 has started (YES in step S73), step 41 and onward of the control flow described above with reference to FIG. 17 is executed. In other words, after the power supply to the fixing heater 123 has started, the power supply to the heater 52 of the sheet laminator 50 starts.

By executing such control, the timing to start the power supply to the fixing heater 123 and the timing to start the power supply to the heater 52 of the sheet laminator 50 are different from each other without occurring at the same time. As a result, the above-described configuration can prevent inconvenience that the matching of the timing to start the power supply leads to overlapping of the starting peak powers and results in an instant increase in the electric power consumption.

Modification 4

Figure 24:
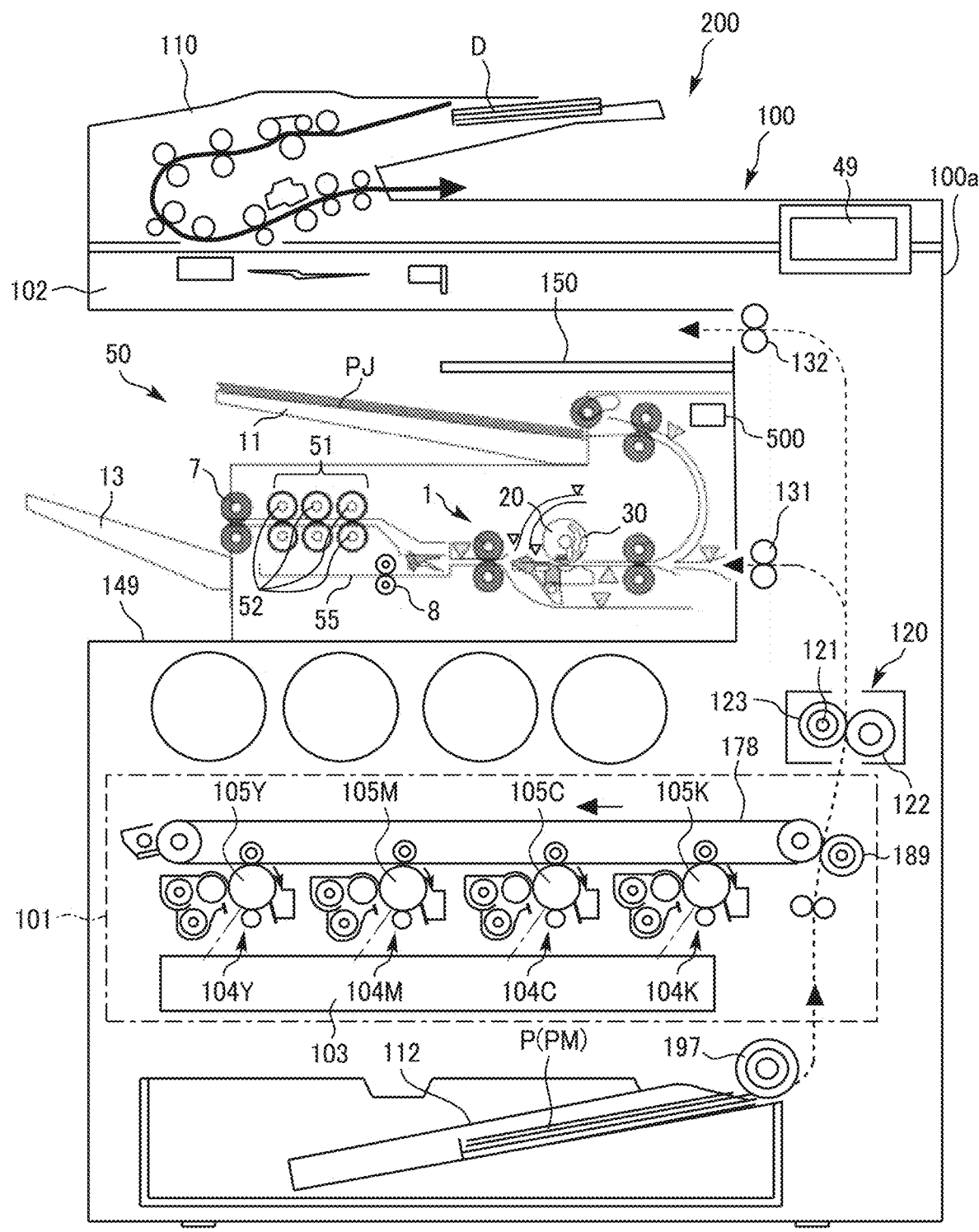
FIG. 24 is a schematic view of an image forming system, according to Modification 4 of an embodiment of the present disclosure.

A description is given of an image forming system according to Modification 4, with reference to FIG. 24.

FIG. 24 is a schematic view of an image forming system according to Modification 4 of the present embodiment.

As illustrated in FIG. 24, an image forming system 200 according to Modification 4 includes the image forming apparatus 100. In the image forming system 200, the image forming apparatus 100 includes the image forming device 101 and the sheet laminator 50. The sheet laminator 50 includes the sheet separation device 1 and the sheet lamination device 51. The sheet laminator 50 is detachably attached to the housing 100a of the image forming apparatus 100. As in the image forming apparatus 100 according to Modification 3, the sheet P that is fed from the sheet feeding device 112 and conveyed by the sheet feed roller 197 in the image forming apparatus 100 is conveyed as the inner sheet PM to the sheet laminator 50 in the image forming apparatus 100 of Modification 4.

In the image forming system 200 illustrated in FIG. 24, the image forming apparatus 100 performs the image forming operations on the sheet P, as described above with reference to FIG. 21. Then, the ejection roller pair 131 ejects the sheet P (that is, the inner sheet PM on which a desired image is formed) from the image forming apparatus 100 to the sheet laminator 50. Then, after the sheet P is conveyed to the sheet laminator 50, the sheet P is inserted into the two-ply sheet PJ, where the sheet laminator 50 performs the sheet laminating operation on the two-ply sheet PJ. Then, the first ejection roller pair 7 ejects the two-ply sheet PJ to the outside of the sheet laminator 50 to stack the two-ply sheet PJ on the first ejection tray 13.

Like Modifications 1 to 3, the image forming system 200 according to Modification 4 including the sheet laminator 50 can select one of the "first mode" for focusing on the productivity of the image forming system 200 and the "second mode" for focusing on the power saving of the image forming system 200 and adjust the time from when the sheet laminating operation is completed to when the heater 52 is turned on in the "second mode" (given time Tx).

For this reason, the sheet laminator can be easy to use and be satisfactory for the user who focuses on the productivity even if the power consumption increases and for the user who focuses on a reduction of the power consumption even if the productivity decreases. When the above-described sheet laminating operation is not performed, the image forming apparatus 100 of the image forming system 200 according to Modification 4 ejects the sheet P having the image formed in the image forming operations, from a second ejection roller pair 132 to the outside of the image forming apparatus 100, so as to stack the sheet P on a second ejection tray 150.

As described above, the sheet laminator 50 is detachably attached to the housing 100a of the image forming apparatus 100. When the sheet laminator 50 is not used, the sheet laminator 50 may be detached from the image forming apparatus 100. In a case in which the sheet laminator 50 is removed from the image forming apparatus 100, a placement surface 149 on which the sheet laminator 50 was installed functions as an ejection tray, and the sheet P that is ejected from the ejection roller pair 131 to the outside of the image forming apparatus 100 is stacked on the placement surface 149, in other words, the sheet P on which a desired image is formed is stacked on the placement surface 149.

The image forming system 200 according to Modification 4 can execute the power saving mode (energy saving mode) to save electric power to be consumed by the devices and components in the housing 100a of the image forming apparatus 100. In the same manner as described with reference to the flowchart of FIG. 22, when the power saving mode (energy saving mode) of the image forming apparatus 100 is executed, the supply of electric power to the sheet laminator 50 is turned off.

Further, in the same manner as described with reference to the flowchart of FIG. 23, after the fixing heater 123 functioning as a fixing heater starts heating the fixing device 120, the heater 52 functioning as a heater starts heating the sheet lamination device 51.

In the image forming system 200 according to Modification 4, the sheet laminator 50 is detachably attached to the image forming apparatus 100, in the space under the document feeder 110.

A description is given of an image forming system according to another embodiment of the present disclosure.

Figure 25A:
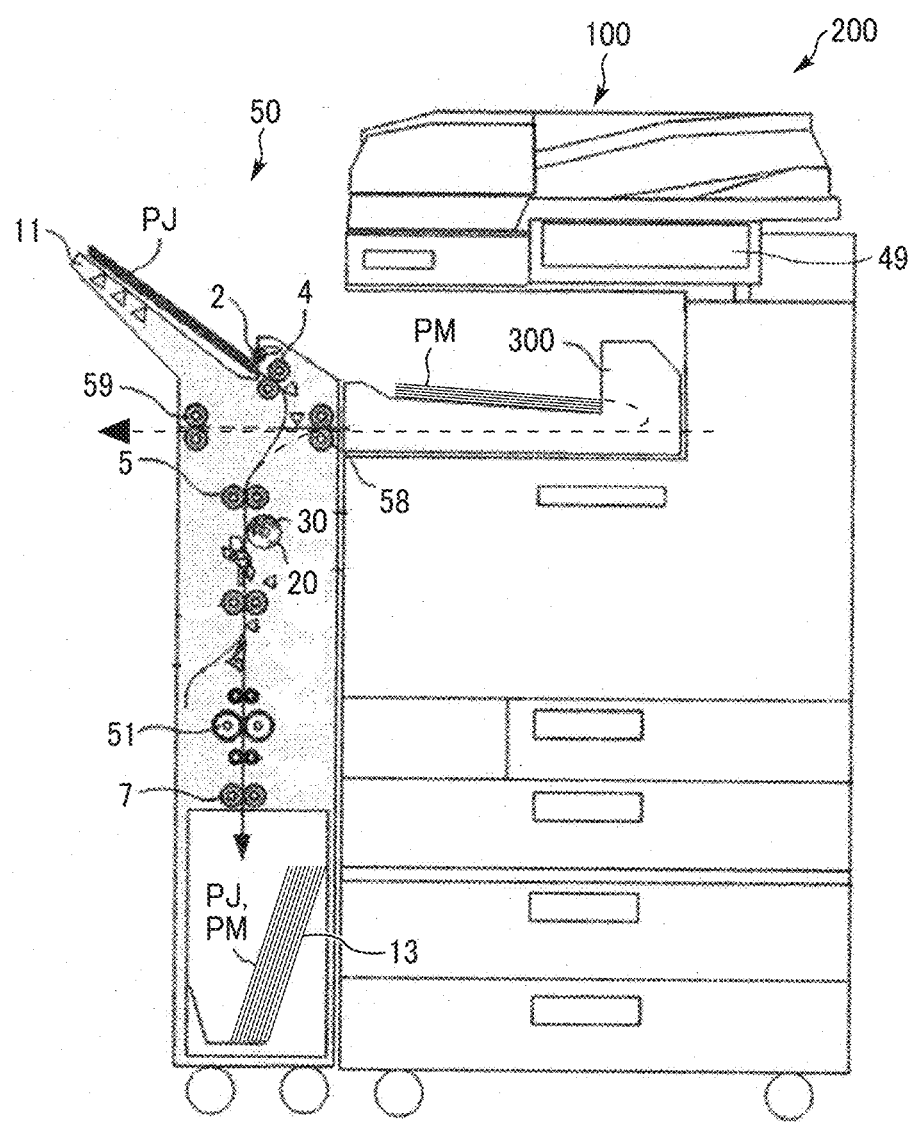
FIG. 25A is a schematic view of an image forming system, according to another embodiment of the present disclosure.

FIG. 25A is a schematic view of an image forming system according to another embodiment of the present disclosure.

As the image forming system 200 illustrated in FIG. 25A, the sheet laminator 50 may be detachably attached adjacent to the image forming apparatus 100, in other words, the sheet laminator 50 may be detachably attached to the image forming apparatus 100 on the side to which the sheet P having an image on the surface is ejected. In such a configuration of the sheet laminator 50, the first feed tray 11 on which the two-ply sheets PJ are stacked, the sheet separation device 1 (winding roller 20), the sheet lamination device 51, and the first ejection tray 13 are sequentially disposed in this order from top to bottom in the vertical direction. In addition to the sheet conveyance passage for guiding the inner sheet PM ejected from the image forming apparatus 100 to the sheet separation device 1 (winding roller 20), the sheet laminator 50 may be provided with another sheet conveyance passage (defined by sheet conveying roller pairs 58 and 59) for ejecting the sheet P ejected from the image forming apparatus 100 without performing the sheet laminating operation on the sheet P.

The sheet laminator 50 may also be provided with a relay device 300 that guides the sheet P (including the inner sheet PM) ejected from the image forming apparatus 100. In this case, the inner sheet PM may be fed from the relay device 300.

Figure 25B:
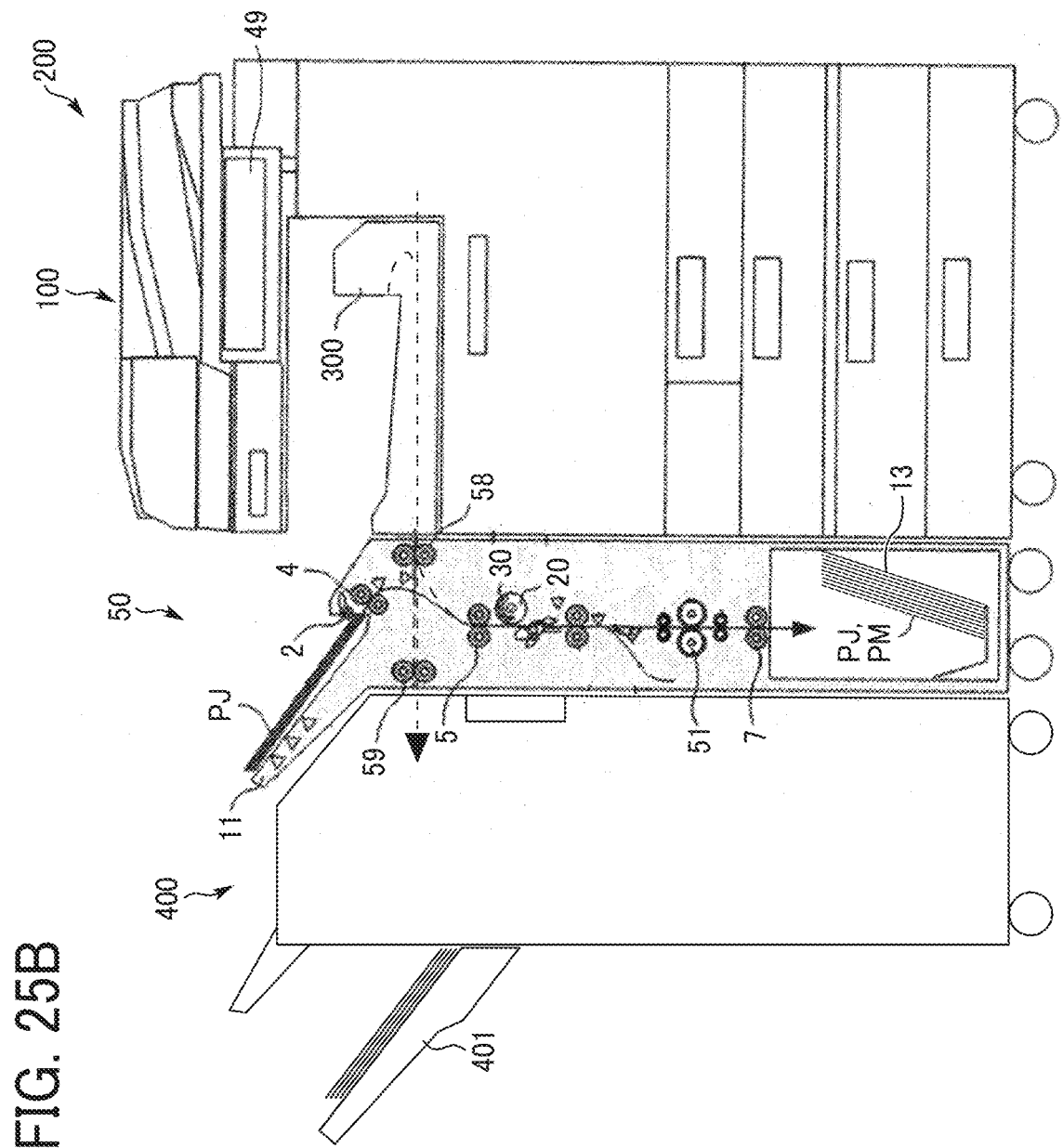
FIG. 25B is a schematic view of an image forming system, according to yet another embodiment of the present disclosure.

Further, FIG. 25B is a schematic view of an image forming system according to yet another embodiment of the present disclosure.

As the image forming system 200 illustrated in FIG. 25B, a post-processing apparatus 400 may be provided to perform the post-processing operations including the punching operation and the stapling operation, on the sheet P ejected from the image forming apparatus 100 through the sheet laminator 50 (or the sheet P without the sheet laminating operation).

As described above, the sheet laminator 50 according to the embodiments of the present disclosure includes the sheet lamination device 51 that performs the sheet laminating operation on the object (i.e., the two-ply sheet PJ and the inner sheet PM) by application of heat and pressure, and the heater 52 that heats the sheet lamination device 51. The sheet laminator 50 according to the embodiments of the present disclosure can select one of the first mode in which the heater 52 constantly heats the sheet lamination device 51 when the power source is turned on and the second mode in which the heater 52 starts heating the sheet lamination device 51 in response to the request of the sheet laminating operation and stops heating the sheet lamination device 51 after the given time Tx has elapsed from completion of the sheet laminating operation. Further, the given time Tx in the second mode can be adjusted.

For this reason, the sheet laminator can be easy to use and be satisfactory for the user who focuses on the productivity even if the power consumption increases and for the user who focuses on a reduction of the power consumption even if the productivity decreases.

Note that embodiments of the present disclosure are not limited to the above-described embodiments, and it is apparent that the above-described embodiments can be appropriately modified within the scope of the technical idea of the present disclosure in addition to what is suggested in the above-described embodiments. The number, position, and shape of the components described above are not limited to those embodiments described above. Desirable number, position, and shape can be determined to perform the present disclosure.

Note that, in the present disclosure, the "end face" of the two-ply sheet is defined as a side face extending in the thickness direction and connecting the front face and the back face of the two-ply sheet. Accordingly, there are four end faces of the rectangular two-ply sheet on the front, back, left, and right.

The present disclosure is not limited to specific embodiments described above, and numerous additional modifications and variations are possible in light of the teachings within the technical scope of the appended claims. It is therefore to be understood that, the disclosure of this patent specification may be practiced otherwise than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet laminator comprising:
a sheet lamination device configured to perform at least one sheet laminating operation on an object by application of heat and pressure;
a heater configured to heat the sheet lamination device; and
circuitry configured to,
change between a first mode and a second mode,
the first mode being a mode in which the heater constantly heats the sheet lamination device while the sheet lamination device is turned on, and
the second mode being a mode in which the heater starts heating the sheet lamination device in response to a request of the sheet laminating operation, and stops heating the sheet lamination device after a given time has elapsed from completion of the sheet laminating operation,
adjust the given time of the second mode, and
select, in response to the second mode being canceled, whether to immediately change from the second mode to the first mode, or to change from the second mode to the first mode upon receiving the request of the sheet laminating operation from a user.

2. The sheet laminator according to claim 1, further comprising:
a sheet separation device configured to perform,
a sheet separating operation to separate a non-bonding portion of a two-ply sheet in which two sheets are overlapped and bonded together at one end as a bonding portion of the two-ply sheet, and
a sheet inserting operation to insert an inner sheet between the two sheets separated from each other by the sheet separating operation; and
the circuitry is further configured to cause the sheet lamination device to perform the sheet laminating operation on the two-ply sheet and the inner sheet as the object after the sheet separation device has performed the sheet separating operation and the sheet inserting operation.

3. The sheet laminator according to claim 1, wherein
the sheet lamination device includes a heat-pressure roller pair configured to heat and press the object while conveying the object; and
wherein the circuitry is further configured to cause the heater to heat at least one of two rollers included in the heat-pressure roller pair.

4. An image forming apparatus comprising:
a housing including an image forming device configured to form an image on a sheet; and
the sheet laminator according to claim 1.

5. The image forming apparatus according to claim 4, wherein the circuitry is further configured to:
execute a power saving mode to save electric power to be consumed by the image forming device; and
turn off supply of the electric power to the sheet laminator in response to the power saving mode being executed by the image forming device.

6. The image forming apparatus according to claim 4, wherein
the housing includes,
a fixing device configured to fix an unfixed image to the sheet by application of heat and pressure, and
a fixing heater configured to heat the fixing device; and
the circuitry is further configured to cause the heater to start heating the sheet lamination device after the fixing heater has started to heat the fixing device.

7. An image forming system comprising:
an image forming apparatus configured to form an image on a sheet; and
the sheet laminator according to claim 1, the sheet laminator configured to be detachably attached to the image forming apparatus.

8. The image forming system according to claim 7, wherein the circuitry is further configured to:
    execute a power saving mode to save electric power to be consumed in the image forming apparatus; and
    turn off supply of the electric power to the sheet laminator in response to the power saving mode being executed in the image forming apparatus.

9. The image forming system according to claim 7, wherein
    the image forming apparatus includes,
        a fixing device configured to fix an unfixed image to the sheet by application of heat and pressure, and
        a fixing heater to heat the fixing device; and
    the circuitry is further configured to cause the heater to start heating the sheet lamination device after the fixing heater has started to heat the fixing device.

10. The sheet laminator according to claim 1, wherein the circuitry is further configured to:
    receive a user input corresponding to the given time on a setting screen displayed on a display panel; and
    adjust the given time based on the received user input.

11. The sheet laminator according to claim 1, further comprising:
    a detector configured to detect a trailing end of the object; and
    the circuitry is further configured to determine a time corresponding to an end of the sheet laminating operation based on a detection result of the detector.

12. The sheet laminator according to claim 1, wherein the circuitry is further configured to:
    display a setting screen corresponding to a length of the given time, the setting screen displayed on a display panel;
    receive a user input corresponding to the given time on the setting screen; and
    adjust the given time based on the received user input.

13. A method of operating a sheet laminator, the method comprising:
    heating a sheet lamination device using a heater;
    performing at least one sheet laminating operation on an object by application of heat and pressure using the sheet lamination device;
    changing between a first mode and a second mode,
        the first mode being a mode in which the heater constantly heats the sheet lamination device while the sheet lamination device is turned on, and
        the second mode being a mode in which the heater starts heating the sheet lamination device in response to a request of the sheet laminating operation, and stops heating the sheet lamination device after a given time has elapsed from completion of the sheet laminating operation;
    adjusting the given time in the second mode; and
    selecting, in response to the second mode being canceled, whether to immediately change from the second mode to the first mode, or to change from the second mode to the first mode upon receiving the request of the sheet laminating operation from a user.

14. The method according to claim 13, further comprising:
    performing, using a sheet separation device,
        a sheet separating operation to separate a non-bonding portion of a two-ply sheet in which two sheets are overlapped and bonded together at one end as a bonding portion of the two-ply sheet, and
        a sheet inserting operation to insert an inner sheet between the two sheets separated from each other by the sheet separating operation; and
    causing the sheet lamination device to perform the sheet laminating operation on the two-ply sheet and the inner sheet as the object after the sheet separation device has performed the sheet separating operation and the sheet inserting operation.

15. The method according to claim 13, wherein
    the sheet lamination device includes a heat-pressure roller pair configured to heat and press the object while conveying the object; and
    the method further comprises causing the heater to heat at least one of two rollers included in the heat-pressure roller pair.

16. The method according to claim 13, further comprising:
    executing a power saving mode to save electric power to be consumed by an image forming device, the image forming device including the sheet laminator; and
    turning off supply of the electric power to the sheet laminator in response to the power saving mode being executed by the image forming device.

17. The method according to claim 13, further comprising:
    heating a fixing device using a fixing heater;
    fixing an unfixed image to the sheet by application of heat and pressure using the fixing device; and
    causing the heater to start heating the sheet lamination device after the fixing heater has started to heat the fixing device.

18. The method according to claim 17, wherein
    the sheet laminator is included in an image forming apparatus; and
    the image forming apparatus further includes the fixing device and the fixing heater.

19. The method according to claim 13, the method further comprising:
    detecting a trailing end of the object using a detector; and
    determining a time corresponding to an end of the sheet laminating operation based on the detecting the trailing end.

20. The method according to claim 13, the method further comprising:
    displaying a setting screen corresponding to a length of the given time, the setting screen displayed on a display panel;
    receiving a user input corresponding to the given time on the setting screen; and
    adjusting the given time based on the received user input.

* * * * *